United States Patent [19]

L'Esperance et al.

[11] Patent Number: 5,543,776
[45] Date of Patent: Aug. 6, 1996

[54] VEHICLE SECURITY SYSTEM

[75] Inventors: Lauren L. L'Esperance, Arlington;
Craig R. Autio, Orange, both of Mass.;
E. Thomas Mariner, North Babylon,
N.Y.; Norval D. Stapelfeld, Brookline,
N.H.

[73] Assignee: Whistler Corporation, Chelmsford, Mass.

[21] Appl. No.: 139,188

[22] Filed: Oct. 19, 1993

[51] Int. Cl.⁶ .................................................. B60R 25/10
[52] U.S. Cl. ........................ 340/426; 180/287; 307/10.2
[58] Field of Search ................................. 340/426, 636,
340/539, 428, 429, 430; 180/287; 307/10.2,
10.3, 10.6

[56] References Cited

U.S. PATENT DOCUMENTS

| | | |
|---|---|---|
| 3,659,265 | 4/1972 | Eversull . |
| 3,671,934 | 6/1972 | Teich . |
| 3,710,317 | 1/1973 | Colsen et al. . |
| 3,740,713 | 6/1973 | Teich . |
| 3,829,829 | 8/1974 | Teich . |
| 3,868,518 | 2/1975 | Teich . |
| 3,936,673 | 2/1976 | Kelly et al. . |
| 3,956,732 | 5/1976 | Teich . |
| 4,032,909 | 6/1977 | Boyce . |
| 4,067,000 | 1/1978 | Carlson .................................. 340/636 |
| 4,158,874 | 6/1979 | Ellsberg .................................. 361/172 |
| 4,232,288 | 11/1980 | Masterman . |
| 4,291,296 | 9/1981 | Seifers . |
| 4,320,382 | 3/1982 | Roucek . |
| 4,361,827 | 11/1982 | Geller . |
| 4,430,685 | 2/1984 | Ellsberg .................................. 361/172 |
| 4,479,110 | 10/1984 | Cipri . |
| 4,523,178 | 6/1985 | Fulhorst .................................. 340/426 |

(List continued on next page.)

OTHER PUBLICATIONS

Product Literature entitled "A'safe Car Security System—Microprocessor & Wireless Design", undated, of AutoMicro Technology Inc., No. 6, Alley 8, Lane 214, Pao–Ping Rd., Yuong–Ho City, Taipei, Taiwan, R.O.C., consisting of four unnumbered pages, Received Mar. 1994.

Product Liberature entitled "A'safe Car Security Products (General Catalog)", undated, of AutoMicro Technology Inc., No. 6, Alley 8, Lane 214, Pao–ping Road, Yuong–Ho City, Taipei, Taiwan, R.O.C., consisting of ten pages, received Mar. 1994.

Primary Examiner—Brent A. Swarthout
Attorney, Agent, or Firm—Hale and Dorr

[57] ABSTRACT

A vehicle security system including a remote control communicating with the system via an RF link for remotely arming and/or disarming the system. Modes of system operation include an armed mode in which sensor outputs are monitored for intrusion indicating conditions and an RF receiver is monitored for remote commands, an alarm mode in which a siren is sounded in response to a detection of an intrusion indicating condition during the armed mode, a disarmed mode in which sensor monitoring for intrusion conditions is disabled, a programming mode in which features of the system are programmable, a valet mode in which only selected sensor outputs are monitored, and a pre-arming mode following system disarming and prior to passive arming, in which the door switch is monitored. A display facilitates programming by providing an indication of the present position within the programming sequence. A customizable auxiliary feature is operable with the remote control during both the armed and disarmed modes and is disabled during the valet mode of operation. The remote control includes a combination vehicle locator/personal safety feature and a power reserving time-out feature. The remote control battery status is indicated both on the remote and on a display located in the vehicle. The vehicle security system includes a memory device for storing system status information so that, upon power up, the system resumes the mode of operation preceding the previous power interruption. The programmable features include adjustable siren chirp volume and selectable siren alarm patterns.

23 Claims, 16 Drawing Sheets

U.S. PATENT DOCUMENTS

| | | | |
|---|---|---|---|
| 4,543,569 | 9/1985 | Karlstrom | 340/539 |
| 4,578,671 | 3/1986 | Flowers | 340/636 |
| 4,635,035 | 1/1987 | Ratzabi . | |
| 4,672,224 | 6/1987 | Low . | |
| 4,673,921 | 6/1987 | Saito et al. | 340/539 |
| 4,689,603 | 8/1987 | Conigliaro et al. | 340/426 |
| 4,740,775 | 4/1988 | Price | 340/429 |
| 4,743,336 | 5/1988 | Hall et al. | 340/539 |
| 4,761,631 | 8/1988 | Hwang . | |
| 4,796,010 | 1/1989 | Bland et al. | 340/541 |
| 4,821,309 | 4/1989 | Namekawa | 379/58 |
| 4,845,464 | 7/1989 | Drori et al. | 340/429 |
| 4,866,417 | 9/1989 | DeFino et al. | 340/429 |
| 4,887,064 | 12/1989 | Drori et al. | 340/426 |
| 4,887,065 | 12/1989 | Robitschko et al. | 340/430 |
| 4,905,271 | 2/1990 | Namekawa | 379/58 |
| 4,922,224 | 5/1990 | Drori et al. | 340/428 |
| 4,926,160 | 5/1990 | Hwang | 340/426 |
| 4,963,856 | 10/1990 | Yukitomo | 340/426 |
| 5,019,803 | 5/1991 | Maram | 340/636 |
| 5,049,867 | 9/1991 | Stouffer | 340/426 |
| 5,079,538 | 1/1992 | DeFino et al. | 340/429 |
| 5,081,667 | 1/1992 | Drori et al. | 379/59 |
| 5,117,217 | 5/1992 | Nykerk | 340/426 |
| 5,146,215 | 9/1992 | Drori | 340/825.32 |
| 5,157,375 | 10/1992 | Drori | 340/429 |

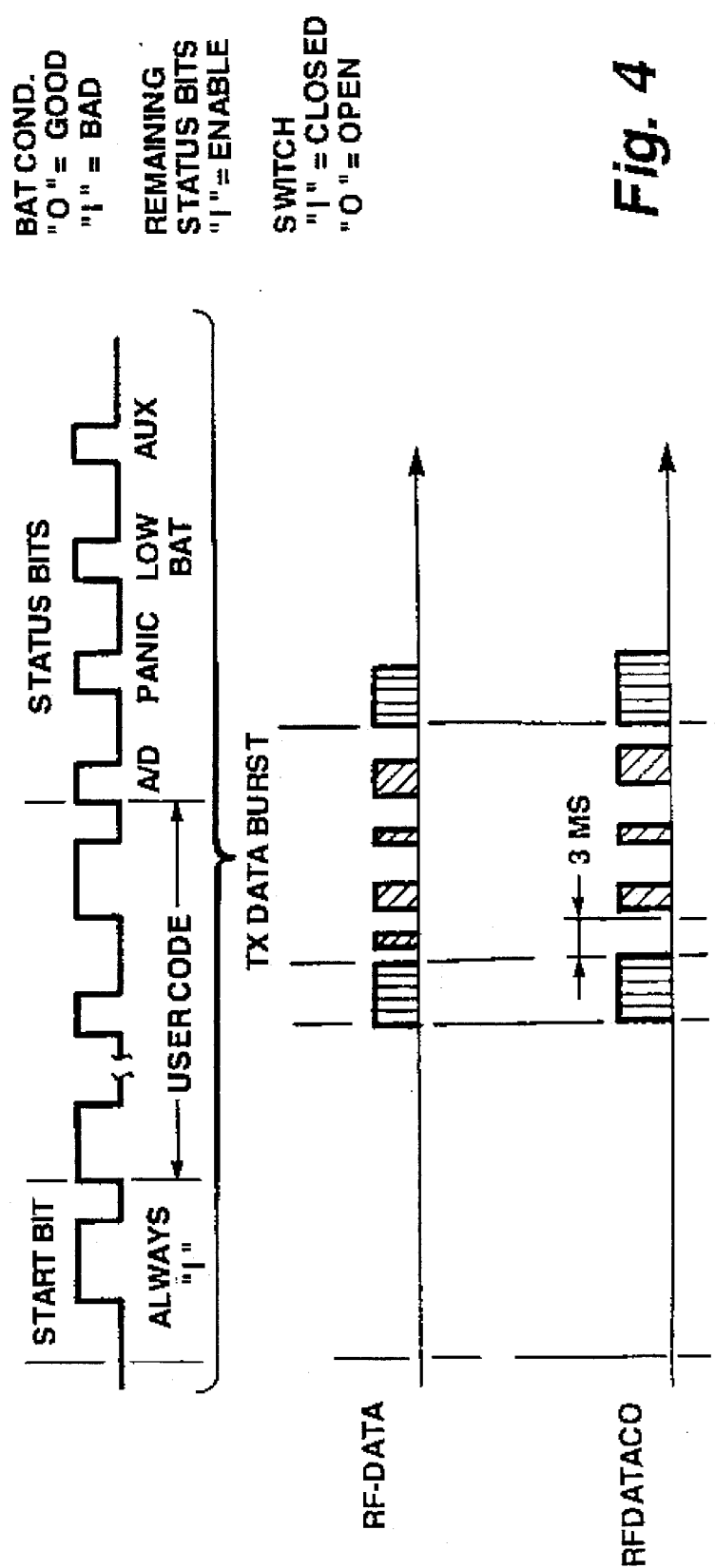

VEHICLE SECURITY SYSTEM

FIELD OF THE INVENTION

This invention relates generally to security systems and more particularly, to a multi-featured vehicle security system.

BACKGROUND OF THE INVENTION

As is known in the art of security systems, the goal of such systems is to keep intruders and particularly, thieves out of a restricted area. To this end, vehicle security systems generate a loud noise upon the detection of conditions indicative of a vehicle intrusion in an effort to draw attention to the intrusion and thus, to frighten off the intruder. Some such systems additionally cause the head lights or parking lights of the vehicle to flash on and off in order to further draw attention to the vehicle.

Most vehicle security systems include a remote control for remotely arming and disarming the system. Remote disarming of the vehicle security system is desirable so that a car owner approaching his or her car can disarm, or de-activate the alarm before entering the car in order to avoid falsely triggering the alarm. Remote arming of the security system is desirable for example where a car owner forgets to arm the security system before locking the car and leaving the area since, by remotely arming the security system, it is not necessary for the car owner to return and enter his or her car.

SUMMARY OF THE INVENTION

In accordance with the invention, a multi-featured vehicle security system is provided with a remote control which communicates with the security system by transmitted RF signals. The remote control permits remote arming and disarming of the security system. More particularly, the security system is operable in various modes including an armed mode in which outputs of a plurality of sensors are monitored for intrusion indicating conditions and an RF receiver is monitored for remote commands, an alarmed mode in which a siren is sounded in response to a detection of an intrusion indicating condition during the armed mode, a disarmed mode in which sensor monitoring for intrusion conditions is disabled, and a pre-arming mode following system disarming and prior to passive arming in which the door switch is monitored. Additional operational modes include a valet mode in which only selected sensor outputs are monitored to prevent false triggering of the alarm by a valet and a programming mode in which features of the system, such as the chirp volume and alarm patterns, are programmable. A diagnostic mode of operation permits the operability of the sensors to be verified and the sensitivity of certain sensors to be adjusted without sounding the siren in the manner associated with an actual intrusion.

The remote control includes a vehicle locator feature to facilitate locating the vehicle by activating a siren for a brief duration upon operator actuation of a locator control. The remote control further includes a personal safety feature, in the form of a panic control which preferably is combined with the locator control. More particularly, a first manner of actuation of a panic/locator control causes the siren to be activated for a first, relatively brief duration to assist in locating the vehicle and a second manner of actuation of the panic/locator control causes the siren to be activated for a second, longer duration in an effort to cause a potential assaulter to flee.

In order to enhance the reliability of the remote control, a low (controller) battery status indicator is provided both on the control itself as well as on a display located in the vehicle. Additionally, a time-out feature is provided in which the remote control microprocessor enters a reduced power consumption mode in the event that one of the controls is actuated for greater than a predetermined duration, consistent with unintentional actuation. With this arrangement, battery power is reserved in order to enhance the reliability of the remote control.

The vehicle security system of the present invention further includes several features providing enhanced vehicle security. A memory device stores operational status information so that, upon power up, the system resumes the mode of operation preceding the previous power interruption. Another feature ensures that the siren is not activated falsely at power up. To this end, the sensor output signals are monitored and, if an intrusion is indicated at a predetermined time after power up, the vehicle operator is alerted to this condition by activation of the siren to provide a chirp sound and the sensor indicating the intrusion is ignored until its output signal indicates a secure condition.

The pre-arming mode of operation is entered after the security system has been disarmed and before it is passively armed, in which the door switch output is monitored. More particularly, during the pre-arming mode, the system may be passively armed in one of two ways: (1) if a predetermined duration lapses after the ignition is turned off, then the system will passively arm; and (2) if a predetermined duration lapses after a remote disarm command is received and the ignition is turned off, then the system will passively arm. In response to receipt of a remote disarm command when passive arming is enabled, the vehicle dome light is turned on for a predetermined duration. During this time, it is possible that a door to the vehicle is opened which, normally causes the dome light to be turned on. In order to prevent unintentional loss of vehicle protection, the dome light is periodically turned off and the door switch output monitored during the predetermined duration.

Additional security system features include a customizable auxiliary feature which is operable via the remote control. Examples of auxiliary features include control of: the trunk switch, a sun/moon roof, the vehicle ignition, a window, a stereo, or a cellular telephone. The auxiliary feature is operable during both the armed and disarmed modes of operation, but access to the auxiliary feature is locked out, or denied during the valet mode of operation.

A shock sensor is provided so that if the vehicle experiences an impact, the siren is activated. In order to enhance the accuracy of the shock sensor, the siren is sounded for a first, brief duration in response to one shock to warn of the condition and is sounded for a second, longer duration in response to a subsequent shock, occurring within a predetermined duration.

BRIEF DESCRIPTION OF THE DRAWINGS

FIG. 4 shows exemplary signal waveforms associated with the RF decoder circuit of the Vehicle Security System of FIG. 3;

DESCRIPTION OF THE PREFERRED EMBODIMENT

Figure 1:
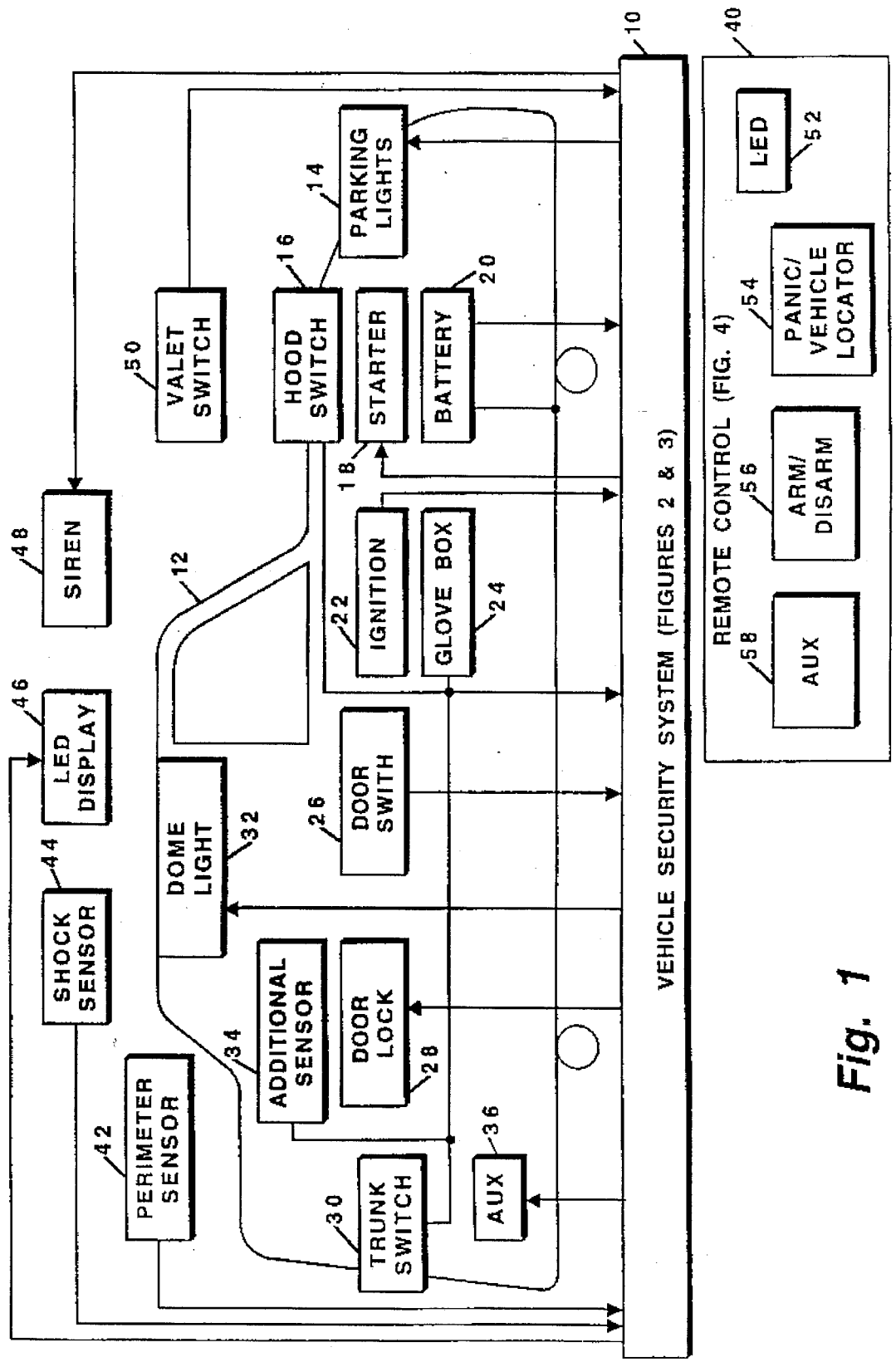
FIG. 1 is a simplified block diagram of a Vehicle Security System.

Referring now to FIG. 1, a vehicle security system 10 operable for use with a remote control 40 is provided on a car 12. The security system 10 includes a plurality of sensors for sensing the status of various components associated with the car 12, each providing an output signal indicative of such status. Also provided is a vehicle security system controller 60 (FIG. 2) which monitors the sensor output signals (i.e., security system inputs) and provides a first siren control signal when the mode of operation of the system is changed, and a second siren control signal when the system is in an armed mode of operation and a condition consistent with an intrusion is indicated by one of the sensor output signals. A siren 48 provides a chirp sound having a predetermined volume and duration in response to the first siren control signal and an alarm sound having a second, longer duration in response to the second siren control signal.

As is conventional, the car 12 has parking lights 14, a hood switch 16, a starter 18, a battery 20, an ignition 22, a glove box switch 24, a car door switch 26 (i.e., the state of which indicates whether any of the vehicle doors are open), a car door lock 28, a trunk switch 30, and a dome light 32. Each of these conventional car components is coupled to the vehicle security system 10, as shown.

Also associated with the car 12 is an additional sensor 34 and an auxiliary feature 36. The additional sensor 34 is provided to increase the versatility of the vehicle security system 10 and may, for example, comprise a glass break sensor. The auxiliary feature 36 also enhances the versatility of the security system by permitting a selected function associated with the car 12 to be controlled by the remote control 40. The auxiliary feature 36 may be a separate feature associated with the car 12, such as a sun/moon roof, an audio system, or a cellular telephone. Alternatively, the auxiliary feature 36 may be one of the above-mentioned car components, such as the ignition 22 or the trunk switch 30.

Additional apparatus provided for use with the vehicle security system 10 and installed on the car 12 includes a perimeter sensor 42, a shock sensor 44, an LED display 46, a siren 48, and a valet switch 50. The perimeter sensor 42 is a microwave sensor used to detect the presence of objects in the vicinity of the car 12 by microwave signal emission detection. Preferably, the perimeter sensor 42 is a "MICROSPHERE" module sold by Whistler, Inc. of Westford, Mass.

The components associated with the car and with the security system generating output signals which provide inputs to the security system 10 (i.e., the hood switch 16, the battery 20, ignition 22, the glove box switch 24, the door switch 26, the trunk switch 30, the additional sensor 34, the shock sensor 44, perimeter sensor 42, and valet switch 50) are referred to herein generally as sensors. All of the sensors except the battery 20 and the valet switch 50 have output signals, the state of which is indicative of a potential intrusion into the vehicle and will be referred to hereinafter as trigger sensors. Moreover, of these trigger sensors, only selected ones generate output signals capable of causing a full alarm to sound (i.e., capable of causing the second siren control signal to be generated). Specifically, the hood switch 16, glove box switch 24, door switch 26, trunk switch 20, additional sensor 34, the shock sensor 44, and the ignition 22 are capable of causing a full alarm condition. Note that while the shock sensor is capable of causing a full alarm condition, it does so only in response to a subsequent, verifying shock indication as will be described. The perimeter sensor 42 on the other hand is capable only of causing the first siren control signal (i.e., resulting in a siren chirp) to be generated, in order to warn of a possible intrusion condition.

In operation, the security system 10, and more particularly, the system controller 60 (FIG. 2), monitors both the sensor output signals and an RF receiver input for commands from the remote control 40. The security system 10 is operable in at least four modes: (1) a pre-arming mode; (2) an armed mode; (3) a disarmed mode; and (4) an alarmed mode. Preferably, the system 10 is additionally operable in a valet mode, a programming mode, a diagnostic mode, and a panic/locate mode. Each of these modes of operation will be described in greater detail below.

The remote control 40 has an LED 52, a panic/locator control 54, an arm/disarm control 56, and an auxiliary control 58. The remote control 40 is powered by a battery 104 (FIG. 5) and the LED 52 is activated only when one of the controls 54-58 is actuated. Additionally, the LED 52 provides an indication of a low battery condition. More particularly, if the battery voltage exceeds a predetermined threshold level, then whenever one of the controls 54-58 is actuated, the LED 52 is driven to flash on and off at a relatively rapid rate; whereas, if the battery voltage falls below the predetermined threshold level, the LED 52 is driven to flash on and off at a slower rate whenever one of the controls 54-58 is actuated. The battery condition is also indicated on the LED display 46 located the vehicle 12 (FIG. 1).

The panic/locator control 54 has a dual function: (1) to assist in locating the vehicle; and (2) to provide a personal safety feature. Upon a first manner of actuation of the panic/locator control 54, such as continuous actuation for less than a predetermined duration such as three seconds, the siren 48 is sounded briefly in order to facilitate locating the car audibly, without causing unnecessary disruption. Moreover, to ensure that the siren 48 is not sounded unintentionally by such first manner of locator control actuation, it may be desirable to enable the locator feature only when the vehicle ignition 22 is turned off. In order to further facilitate locating the vehicle, particularly in a dark area, it may be desirable to cause the parking lights 14 and/or the dome light 32 to flash on and off simultaneously as the siren 48 is sounded. In one illustrative example, in response to a one second continuous actuation of the control 54 with the car ignition 22 turned off, the siren 48 is sounded for a series of three, one second bursts and the parking lights 14 are flashed on and off for three seconds.

The control 54 additionally provides a personal safety feature in response to a second manner of actuation, such as continuous actuation for greater than the predetermined duration. The panic, or second manner of actuation of the control 54 causes the siren 48 to be sounded for a longer duration than is caused by the locator manner of actuation, in an effort to frighten off a potential assaulter. In an illustrative example, in response to actuation of the panic/locator control 54 for four seconds, the siren 48 is sounded indefinitely, until the arm/disarm control 56 is activated (or the system 10 is disarmed without use of the remote 40, as will be described below).

In order to enhance the effectiveness of this personal safety feature, this feature is operable whether or not the ignition 22 is turned on (contrary to the locate manner of actuation of control 54) and the vehicle starter 18 is not interrupted in response to a panic generated siren control signal (contrary to other manners of activation of the siren 48 in response to an intrusion indicating condition). That is, when the siren 48 is activated in response to an intrusion indication by a trigger sensor, the starter 18 is interrupted to ensure that the intruder cannot start the car 12. However, when the siren 48 is activated in response to a panic manner of actuation of the panic control 54, the car operator may want to flee in the car 12 rapidly. Thus, the starter 18 is operable when the siren 48 is sounded in response to the panic manner of actuation of control 54.

The arm/disarm control 56 of the remote control 40 toggles the operation of the security system 10 between the armed and disarmed modes of operation. The security system 10 is armed when it is desired to protect the vehicle 12 from unwanted intruders and is disarmed when this protection is not desired. Note that, alternatively, the armed and disarmed modes of operation can be entered and exited without using the remote control 40. More particularly, the armed mode can be entered passively, once a passive arming capability of the system 10 is enabled and a sequence of steps associated with the pre-arming mode of operation is performed, as described below in conjunction with FIGS. 9 and 9A. The system may be disarmed without use of the remote 40 by a predetermined sequence of commands, such as activating the valet switch 50 and simultaneously executing a predetermined ignition sequence, such as consecutively turning the ignition 22 on, off, on, off, and on.

The auxiliary control 58 is used to remotely activate the auxiliary feature 36 which is operable during both the armed and disarmed modes of operation, as described below. For example, if the auxiliary feature is the car ignition 22, it may be desirable to activate the ignition from a remote location, such as from inside the house, to warm-up the car 12.

Figure 2:
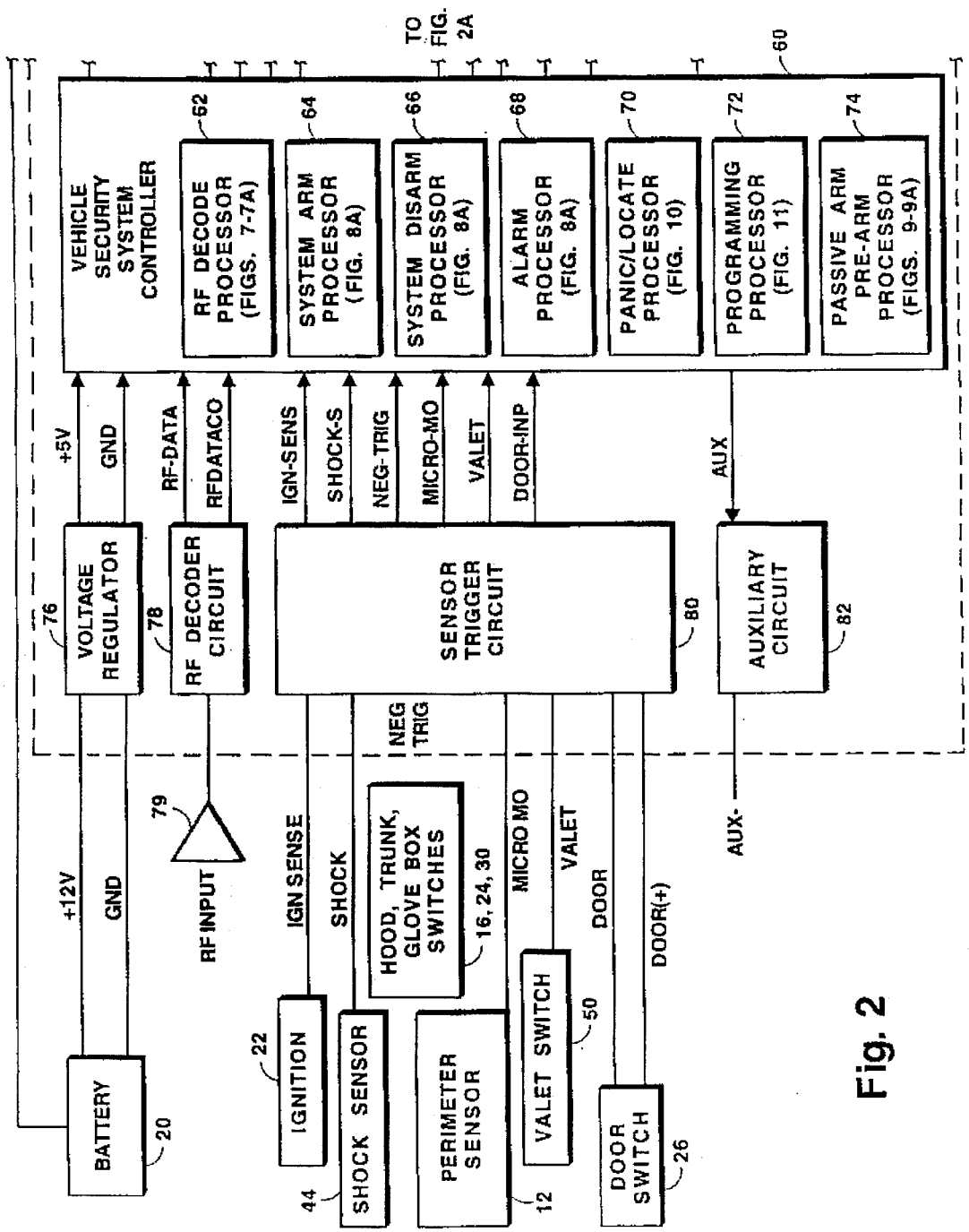
FIGS. 2 and 2A are a detailed block diagram of the Vehicle Security System of FIG. 1.
Figure 2A:
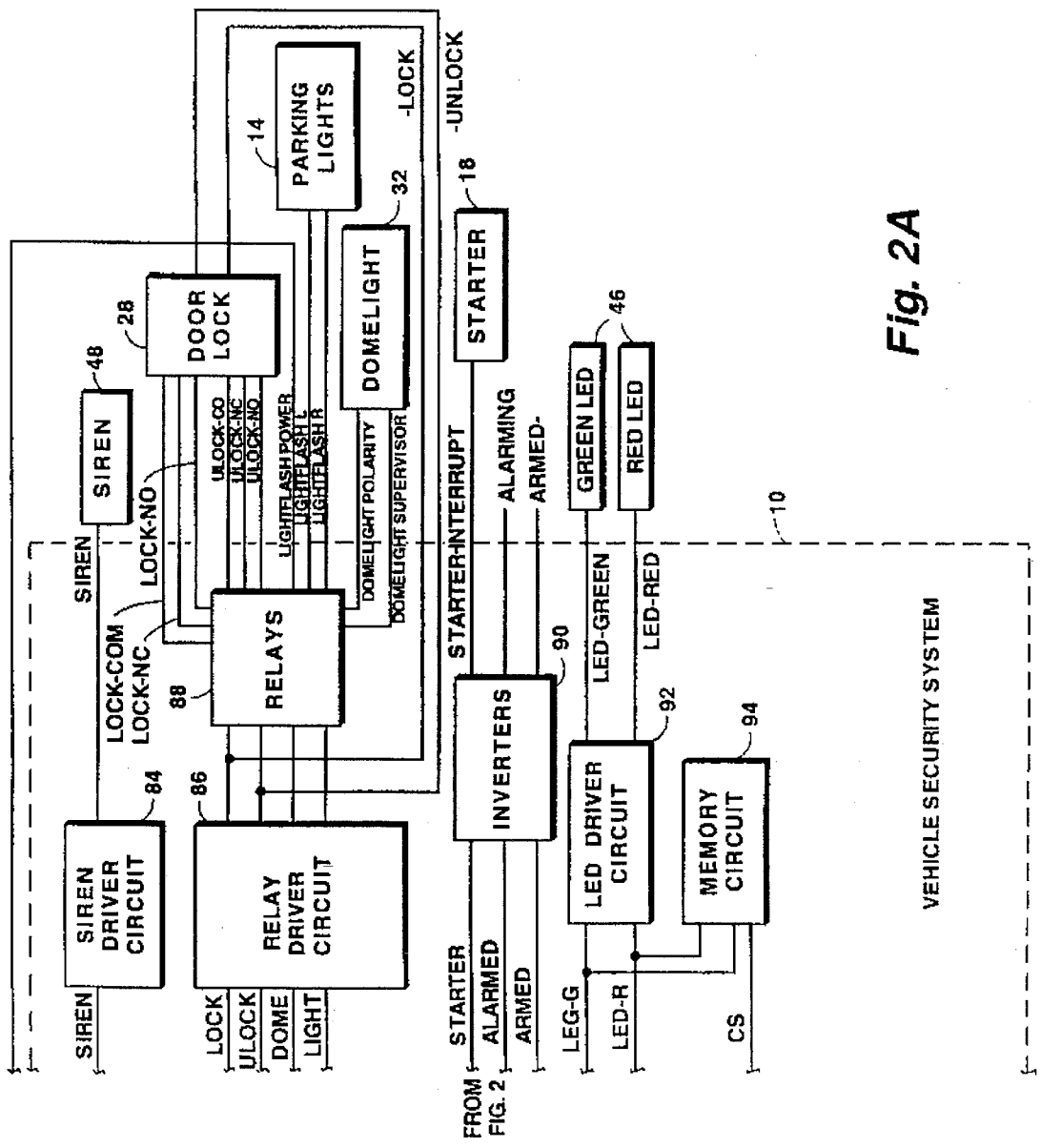

Referring now to FIGS. 2 and 2A, the vehicle security system 10 and its connections to various vehicle and security system components are shown in greater detail. As noted above, the security system 10 includes a controller 60 which can be described as including several processors including: an RF decode processor 62, a system arm processor 64, a system disarm processor 66, an alarm processor 68, a panic/locate processor 70, a programming processor 72, and a passive arm and pre-arming processor 74. It should be understood that the controller 60 may be implemented with various known circuitry, such as the illustrative microprocessor shown in FIG. 3A. The process steps performed by each of the processors 62-74 are described in conjunction with the Figures as indicated in FIGS. 2 and 2A.

Figure 7A:
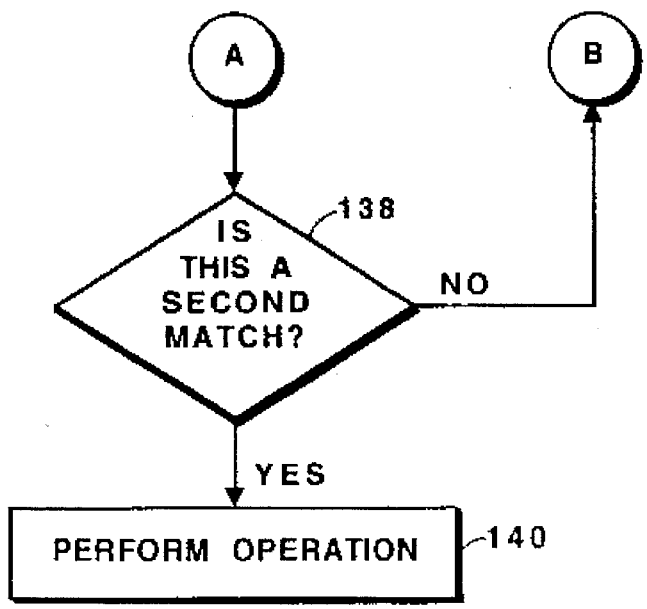
FIGS. 7 and 7A are flow diagrams of processing steps performed by the RF decode processor of the Vehicle Security System controller of FIG. 2.

The car battery 20 provides +12 volts to a voltage regulator 76 which generates +5 V for use by the vehicle security system circuitry. As mentioned above, the remote control 40 communicates with the security system 10 by RF signal transmission. More particularly, RF signals transmitted by the remote control 40 are received at an RF antenna 79 for coupling to an RF decoder circuit 78. The decoder circuit 78 converts the received RF signal into a pair of signals RF-DATA, RFDATACO. The RF-DATA signal contains a remote control identifying digital word, referred to hereinafter as a user code, as well as information indicative of actuation of the controls 54-58. The RFDATACO signal contains like information to the RF-DATA signal and is used to verify that the received data corresponds to a predetermined format. In response to receipt of data having the predetermined format, it is determined whether such received data was transmitted by the remote control 40 associated with security system 10 by comparing the received user code with a predetermined, stored user code. Having determined that the received user code corresponds to the stored user code, the data received from the remote control 40 is processed. The RF decoder circuit 78 is described in greater detail below in conjunction with FIGS. 3 and 7-7A.

Each of the car ignition 22, hood switch 16, trunk switch 30, glove box switch 24, door switch 26, shock sensor 44, perimeter sensor 42, and valet switch 50 is coupled to a sensor trigger circuit 80 which includes signal buffers. In response to the sensor output signals (i.e., IGNSENSE, SHOCK, NEGTRIG, MICROMO, VALET, DOOR, and DOOR(+)), the sensor trigger circuit 80 provides corresponding buffered signals (i.e. IGN-SENS, SHOCK-S, NEG-TRIG, MICRO-MO, VALET, DOOR-INP), respectively, to the security system controller 60. Note that while the additional sensor 34 is not shown in FIGS. 2, 2A, 3, and 3A for simplicity, sensor 34 may be tied to the NEGTRIG signal line, along with the hood switch 16, trunk switch 30, and glove box switch 24.

In response to actuation of the auxiliary control 58 of remote control 40, and receipt of an indication of such control actuation via the RF decoder circuit 78, the system controller 60 provides an AUX control signal to an auxiliary circuit 82, as shown. More particularly, in order to avoid unintentional activation of the auxiliary feature 36, the feature 36 is activated only in response to a predetermined manner of actuation of the control 58, such as two actuations within three seconds. The auxiliary circuit 82 includes a driver to generate an AUX- output signal for coupling to the auxiliary feature 36 (FIG. 1) to activate such feature.

Also provided by the system controller 60 is a siren control signal for sounding the siren 48. More particularly, the siren control signal is coupled to a siren driver circuit 84, the output of which provides the SIREN signal. Recall that the siren 48 is sounded for a brief duration to provide a chirping sound in response to a first siren control signal when the security system 10 changes mode of operation and is sounded for a longer duration in response to a second siren control signal upon the occurrence of an intrusion indicating condition (i.e., a full alarm condition) The first and second siren control signals are both carried by the SIREN signal line and have varying duration.

A relay driver circuit 86 receives control signals (i.e., LOCK, ULOCK, DOME, and LIGHT) from the system controller 60 and provides corresponding driver signals to relays 88 and the door lock 28, as shown. The relays 88 provide additional control signals to lock and unlock the door lock 28, as well as providing control signals to activate the parking lights 14 and the dome light 32. With this arrangement, the system controller 60 can control the parking lights 14 and the dome light 32 to flash on and off.

The car starter 18 is also controlled by the system controller 60 and, more particularly, by a STARTER output signal thereof. The STARTER output signal is inverted by inverters 90 to provide a STARTER-INTERRUPT control signal to the starter 18. This arrangement permits the controller 60 to disengage the starter 18 upon the detection of an intrusion indicating condition of a trigger sensor output so that the car 12 cannot be started.

Some of the trigger sensors (i.e., the shock sensor 44, the perimeter sensor 42, and the additional sensor 34) have a power input, a ground input, and an output. In order to preserve power, such sensors may be powered only when the security system 10 is in the armed mode of operation. To this end, the system controller 60 provides an ARMED output signal which is inverted by inverters 90 to provide an ARMED- signal at the ground connection point of each such sensor. Specifically, the ARMED- signal is active during the armed mode of operation to close the power loop to these sensors. In this way, the ARMED- signal "enables" these sensors. Similarly, the ALARMING signal is active during the alarmed mode of operation and may be coupled to devices (not shown) which are advantageously activated during an alarm condition (i.e., a full alarm condition). For example, a second siren (not shown), located in the car 12, may be coupled to the ALARMING signal for activation during an alarm condition.

The LED display 46 of the vehicle security system 10 is a tri-color display having two LEDs, one red and one green, activated to provide a red display, a green display, or an amber display, with the amber display provided by simultaneously activating both the red and green LEDs. The display 46 is located in the vehicle 12, and may be mounted on the dashboard, to indicate various system conditions such as the present system mode of operation, and to assist in the programming of the system 10, as will be described below. The green and red LEDs are controlled by LED-GREEN and LED-RED signals provided by a driver circuit 92 in response to controller output signals LED-G and LED-R, respectively.

Also provided in the vehicle security system 10 is a memory device or circuit 94 which receives the controller LED output signals LED-G, LED-R and an additional controller output signal CS, as shown. Memory circuit 94 monitors and communicates with microcontroller 60 via the LED control signals LED-G, LED-R in response to enablement by the CS signal. With this arrangement, if power to the security system 10 is interrupted, the status of the system (i.e., mode of operation) just preceding the power interruption may be recalled from the memory device 94 and resumed by the controller 60. In one illustrative embodiment, the memory device 94 is an EEPROM.

Figure 3:
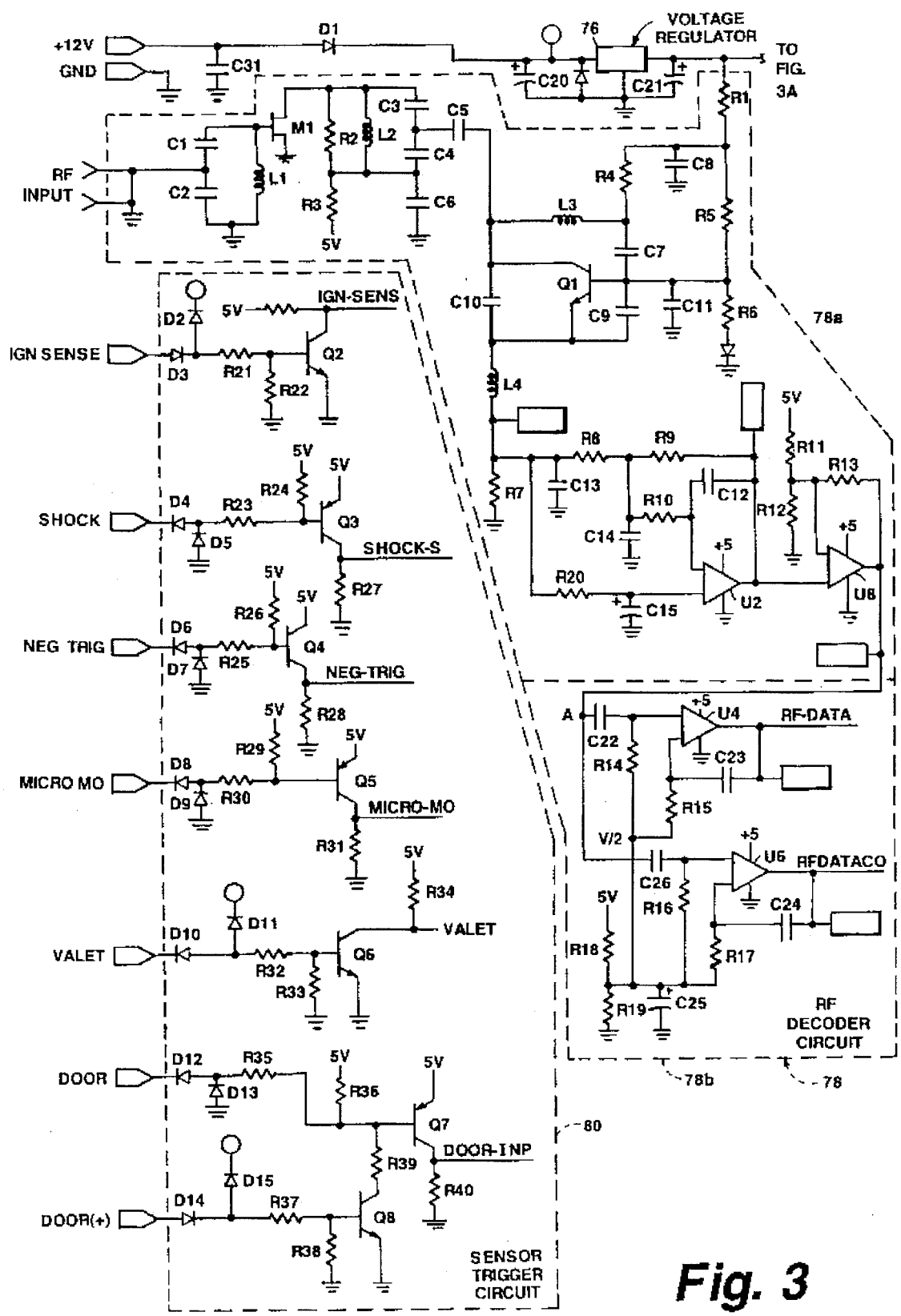
FIGS. 3 and 3A are a schematic diagram of the Vehicle Security System of FIG. 1.
Figure 3A:
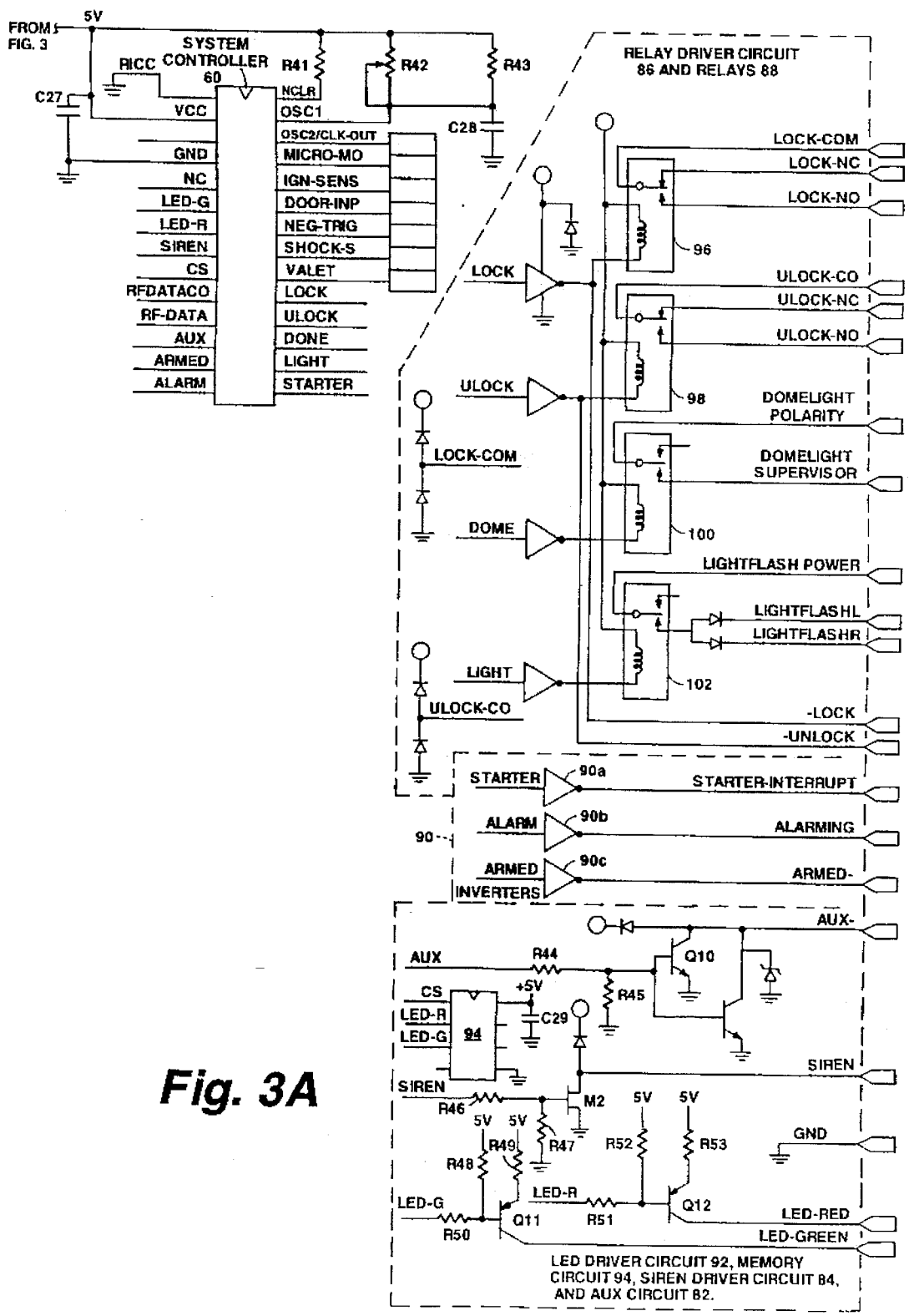

Referring now to FIGS. 3 and 3A, a schematic of the vehicle security system 10 is shown to include the voltage regulator 76, RF decoder circuit 78, sensor trigger circuit 80, relay driver circuit 86 with relays 88, inverters 90, and the vehicle security system controller 60. Also shown in FIG. 3A is the LED driver circuit 92, the memory circuit 94, the siren driver circuit 84, and the auxiliary circuit 82. As previously mentioned, voltage regulator 76 provides +5 volts to the security system circuitry, as shown. A first portion 78a of the RF decoder circuit 78 includes a conventional super regenerative receiver. A second portion 78b of the RF decoder circuit 78 receives the super regenerative decoder output signal at circuit node A, which is coupled to a pair of comparators U4, U6 through capacitors C22, C26, respectively. In response to the data thus coupled to each of comparators U4, U6 the RF-DATA and the RFDATACO signals are generated and coupled to the vehicle security system controller 60, as shown.

Referring now also FIG. 4, exemplary RF-DATA and RFDATACO signal waveforms are shown. Each data burst transmitted from remote control 40 and received by security system 10 has a predetermined format, or coding scheme. More particularly, as shown in the exploded view of a received digital word, data burst, at the top of FIG. 4, the burst commences with a start bit which, in the illustrative example, is always a logic high, or one. The start bit is followed by an N bit user code which is the unique digital word, or signature referred to above and associated with a particular remote control 40, for example, where N=sixteen. Finally, the digital word includes four status bits, one corresponding to actuation of the arm disarm control 56, one corresponding to actuation of the panic/vehicle locator control 54, one corresponding to the status of the remote control battery, and one corresponding to actuation of the auxiliary control 58.

The RFDATACO signal is provided to detect when a received digital word represents a transmitted data burst having the predetermined format. Stated differently, RFDATACO is used to distinguish a transmitted data burst from noise received between successive data bursts (i.e., shown in the illustrative RF-DATA and RFDATACO signals of FIG. 4 with diagonal lines). To this end, the time constants associated with the RC networks at the inverting inputs of comparators U4 and U6 differ, with time constant associated with RC network C22, R14 being faster than that associated with RC network C26, R16. Thus, when a transition from a logic low to a logic high occurs at the output of comparator U8, the capacitively coupled inverting inputs of comparators U4 and U6 decay at different rates. Specifically upon such a positive going transition, the inverting input to comparator U4 decays faster than that of comparator U6. With this arrangement, the transitions of the RFDATACO signal are substantially identical to those of the RF-DATA signal within a particular digital word since the bit rate is relatively high. However, the RFDATACO signal is slower to transition in response to slower data rates, such as the data rate of noise received between data bursts. Thus, after the receipt of a particular data burst, the RFDATACO signal is slower to transition to a logic high state to follow the noise, as shown.

Specifically, the time constants of the RC networks at the inverting inputs of comparators U4, U6 are selected so that the RFDATACO signal remains low for a predetermined duration, such as three milliseconds, after receipt of a data burst having the predetermined format, while the RF-DATA signal is transitioning in response to noise. Thus, the RFDATACO signal being in a logic low state for approximately three milliseconds indicates that a remote transmitted data burst having the predetermined format has been received. Thereafter, the bits of the RF-DATA signal corresponding to the three milliseconds that the RFDATACO signal remained in a logic low state are removed from memory and the preceding number of bits corresponding to the number of bits in the digital word of the predetermined coding format are processed, as described in greater detail below in conjunction with FIGS. 7–7A.

Note that the length of the interval during which the RFDATACO signal remains in a logic low state following the three milliseconds after the end of the data burst is indicative of the strength of the received RF data. That is, the longer that the RFDATACO signal remains in a logic low state, the stronger the RF transmission and thus, presumably, the closer the remote control 40 to the vehicle security system 10. This signal strength information may be used to enhance the remote learning feature of the system described below. Suffice it here to say that upon initial power up of the system 10, an initialization process is performed in which the unique user code associated with the remote control 40 is "learned" by the system 10. In a facility in which several security systems are installed and initialized, it may be desirable to require that the RFDATACO signal be in a logic low state for a predetermined duration before enabling the remote learning capability, in order to ensure that the system learns the user code associated with the corresponding remote control 40.

Referring still to FIGS. 3 and 3A, the sensor trigger circuit 80 includes a plurality of buffers, each one associated with one of the security system input signals and providing corresponding trigger signals to the system controller 60. Specifically, buffer circuits buffer the output signals of the ignition 22, the shock sensor 44, the combined output signal coupled to the hood switch 16, glove box 24, trunk switch 30, and additional sensor 34, the perimeter sensor 42, the valet switch 50, and the door switch 26.

The operation of the system controller 60 will be described in greater detail below in conjunction with the flow diagrams of FIGS. 6–11. Suffice it here to say that the system controller 60 provides output signals for controlling the parking lights 14, the siren 48, the starter 18, the dome light 32, the door lock 28, the LED display 46, and the auxiliary feature 36, as mentioned above. More particularly, the siren output signal of the controller 60 is coupled to a driver transistor M2 to provide the SIREN control signal, as shown. The AUX controller output signal is coupled to a driver transistor Q10 to provide the AUX- control signal to activate the auxiliary feature 36. The LED driver circuit 92 (FIG. 2A) includes resistors R48-R53 and transistors Q11-Q12 arranged to invert controller output signals LED-G, LED-R to provide corresponding LED control signals LED-GREEN, LED-RED for driving the green and red LEDs. The STARTER-INTERRUPT, ALARMING, ARMED signals are as noted above and specifically, are provided at the outputs of inverters 90a, 90b, and 90c, respectively, the inputs of which are provided by controller output signals STARTER, ALARM, and ARMED, respectively. The door lock 28 is controlled by relays 96 and 98 which in turn, are activated by controller output signals LOCK and ULOCK. In a similar manner, the dome light 32 is controlled by a relay 100, the activation of which is controlled by controller output signal DOME and the parking lights 14 are controlled by a relay 102, the activation of which is controlled by controller output signal LIGHT.

Controller 60 has an RC network associated therewith for establishing an internal clock signal. Specifically, the RC network comprises resistor R43 and capacitor C28 which are arranged to provide the clock signal at the OSC1 port of controller 60. The accuracy of the clock signal thus established is enhanced by a compensation feature performed during production of the system 10. An external reference clock calibration signal, such as a one KHz signal, is coupled to the perimeter sensor input (i.e., MICRO-MO), or other designated input port of the controller 60. Controller 60 measures the calibration clock signal and compares it with its nominal value to determine a difference value. The difference value provides a compensation factor used by the controller 60 to compensate for any inaccuracy in the RC generated clock signal. With this arrangement, a less expensive, RC type of microprocessor can be used to provide controller 60 without sacrificing the clocking accuracy achievable with a crystal type of microprocessor.

Figure 5:
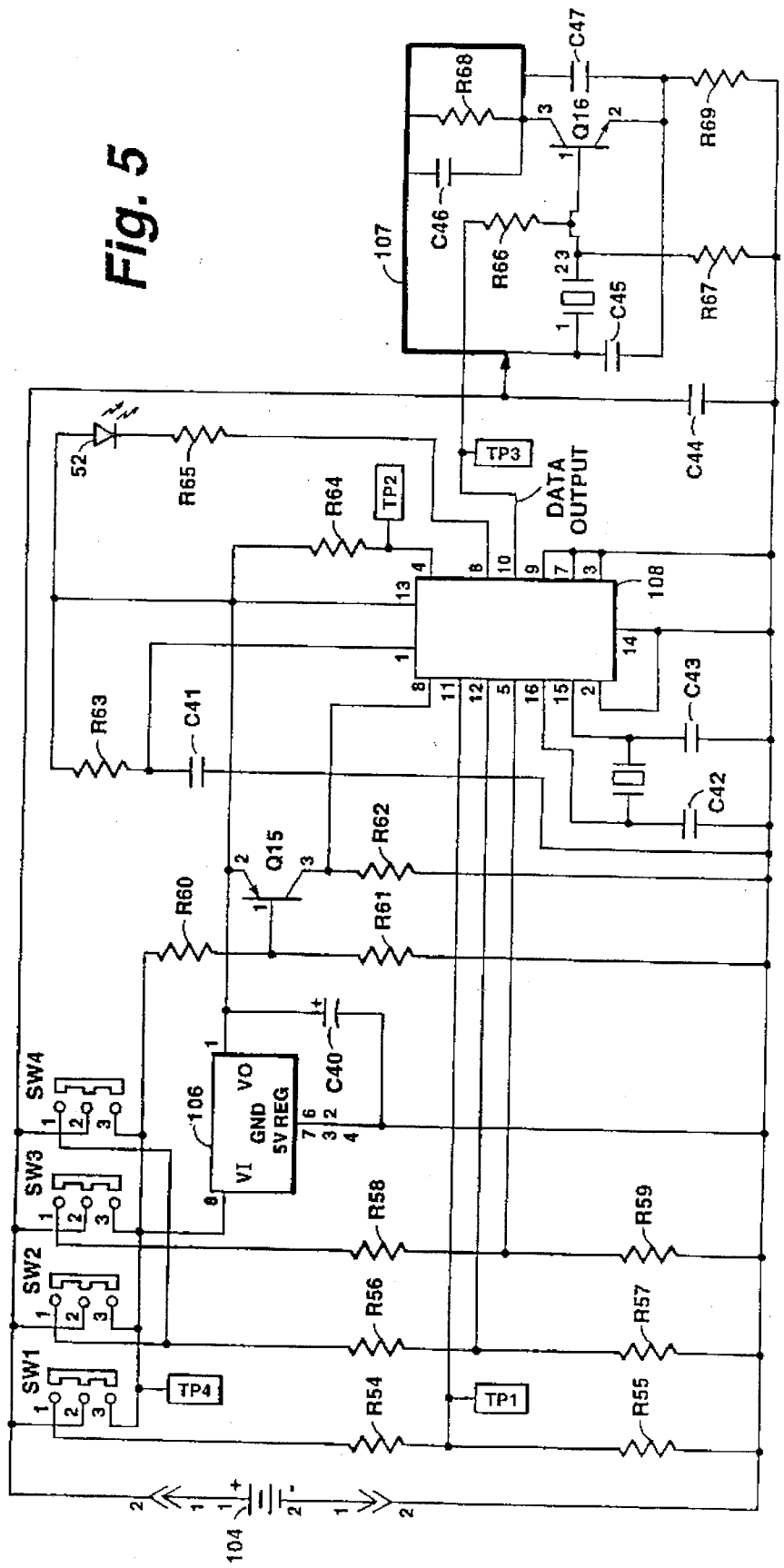
FIG. 5 is a schematic diagram of the remote control of the Vehicle Security System of FIG. 1.

Referring now to FIG. 5, the remote control 40 will be described in greater detail. Switches SW1-SW3 provide the auxiliary control 58, the arm/disarm control 56, and the panic/vehicle locator control 54, respectively. An additional switch SW4 is provided in parallel with switch SW2, such as may be desirable for reasons of product differentiation. The remote control 40 is powered by a battery 104 which is selectively coupled to the input of a voltage regulator 106 in response to actuation of one of the controls 54-58. That is, the battery voltage is provided at the input of the voltage regulator 106 only when one of the switches SW1-4 is actuated. Upon power being applied to a microprocessor 108 by voltage regulator 106, the input ports, corresponding to the controls 52-58 and a battery status port, are read. Specifically, the microprocessor input port coupled to the circuit node between resistors R54 and R55 corresponds to the status of switch SW1 (i.e., the auxiliary control 58 of FIG. 1), the input port coupled to the circuit node between resistors R56 and R57 corresponds to the status of switches SW2 and SW4 (i.e., the arm/disarm control 56 of FIG. 1), and the input port coupled to the circuit node between resistors R58 and R59 corresponds to SW3 (i.e., the panic/ locate control 54 of FIG. 1). The collector electrode of transistor Q15 is coupled to the battery status input port to microprocessor 108. More particularly, when one of the switches SW1-4 is actuated, the battery voltage is coupled to a voltage divider comprising resistors R60, R61. If the battery voltage, as divided by resistor divider R60, R61, biases transistor Q15 to be cut off (i.e., corresponding to the battery voltage being greater than a predetermined threshold level) then the battery status input to the microprocessor 108 is in a logic low state, indicating an acceptable battery voltage level. If however, the battery voltage, as divided by resistor divider R60, R61, is low enough to cause transistor Q15 to conduct (i.e., corresponding to the battery voltage being less than the predetermined threshold level), then the battery status input to remote control microprocessor 108 is in a logic high state, indicating that the battery voltage is unacceptably low.

The switch status and the battery status thus read are combined with a unique user code stored in microprocessor 108 to provide a data output signal of microprocessor 108 which is transmitted to the vehicle security system 10 via RF antenna 107.

As mentioned, the remote LED 52 (see also FIG. 1) is activated whenever one of the controls 54-58 on the remote 40 is actuated and also is activated to indicate a low battery condition. More particularly, if the battery voltage exceeds the threshold level, then whenever one of the controls 54-58 is actuated, the LED 52 is driven to flash at a relatively rapid rate; whereas, when the battery voltage falls below the threshold level, whenever one of the controls 54-58 is actuated, the LED 52 is driven to flash at a slower rate. To this end, LED 52 is driven by an output of microprocessor 108 through a resistor R65, as shown. The battery condition is also indicated on the LED display 46 at vehicle 12 in response to transmission of the battery Status bit shown in FIG. 4.

As mentioned, the remote control 40 has a remote timeout feature whereby the remote control microprocessor 108 enters a reduced power consumption mode in response to one of the switches SW1-4 being continuously actuated for greater than a predetermined duration, such as twenty seconds, consistent with unintentional actuation. More particularly, in response to actuation of one of the switches SW1-4 for longer than twenty seconds, the microprocessor 108 enters a reduced power mode during which reduced power is drawn from the voltage regulator 106 in order to conserve battery power. With this arrangement, battery power is conserved in order to enhance the reliability of the remote control 40.

Figure 6:
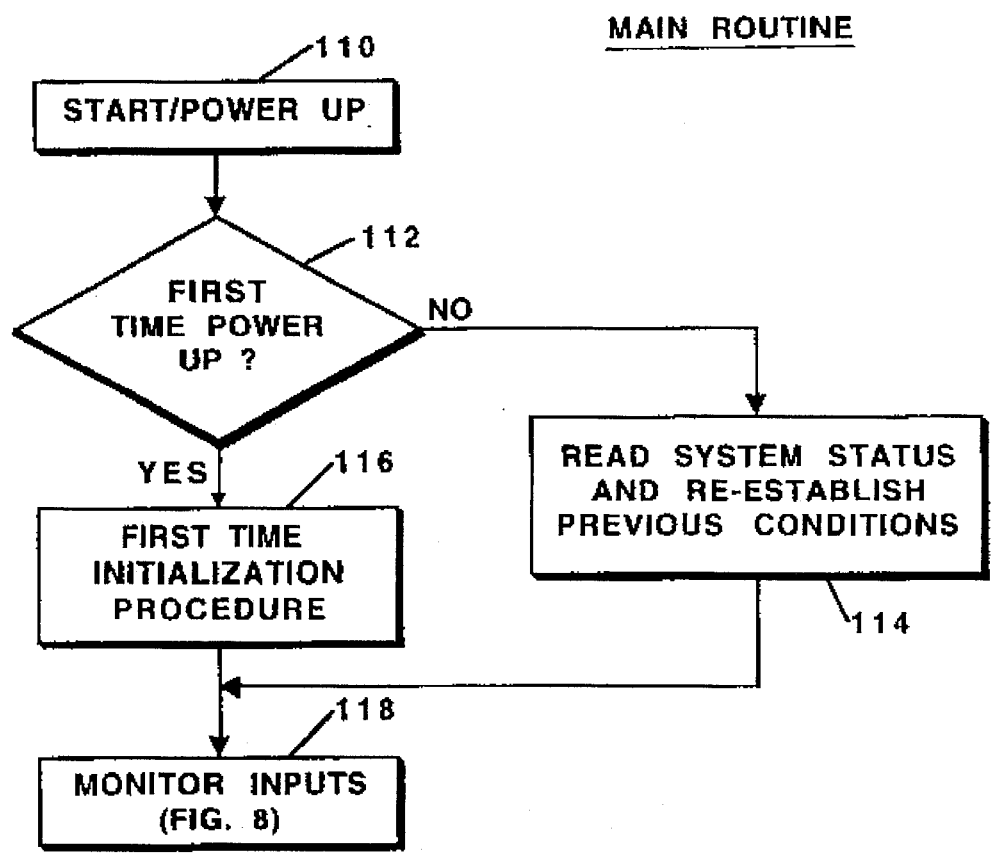
FIG. 6 is a simplified flow diagram of processing steps performed by the Vehicle Security System controller of FIG. 2.

Referring now to FIG. 6, steps performed by the vehicle security system controller 60 (FIG. 3A) are shown. The security system 10 is powered in process step 110 by tapping into the constant +12 volt battery source of the car battery 20. Once the security system 10 is powered, it is determined in process step 112 whether the preceding application of power is the first to the security system 10. The determination as to whether the system is in an initial power up routine is achieved by looking at the memory device 94 and reading the states of status bits stored in a register within memory 94. Alternatively, this determination may be based on the LED display 46 which provides a predetermined display arrangement upon initial power up. If the application of power to the security system in step 110 is the first, an initialization procedure is performed in step 116. The initialization procedure includes a predetermined sequence of steps which alert the installer that (1) the system 10 is properly installed; and (2) that a new remote, or remotes must be learned by the system 10. For example, the initialization procedure may comprise turning the ignition 22 on, actuating either the arm/disarm control 56 or the auxiliary control 58 on the remote 40, and then turning the ignition off.

Learning new remotes is also part of the initialization procedure of step 116 in which the unique user code associated with remote 40 is transmitted by the remote 40, received by the system 10, and stored in the EEPROM 94 (FIG. 3A). Thereafter, in process step 118, the inputs to the security system 110, and specifically to the security system controller 60, are monitored as described below in conjunction with FIG. 8.

If it is determined in process step 112 that the application of power to the security system 10 in process step 110 is not the first such application, process step 114 is performed in which the system status is read by controller 60 from memory device 94 (FIG. 3A) and the system status (i.e., mode of operation) preceding the last interruption of power to the security system is resumed. More particularly, the EEPROM 94 stores the unique user code, the status of the system 10 (i.e., the present mode of operation), and programmable features, described below. In this way, if power to the system is interrupted by an intruder during an alarming mode, once power is reapplied, the system will enter the alarmed mode as is desirable.

Figure 7:
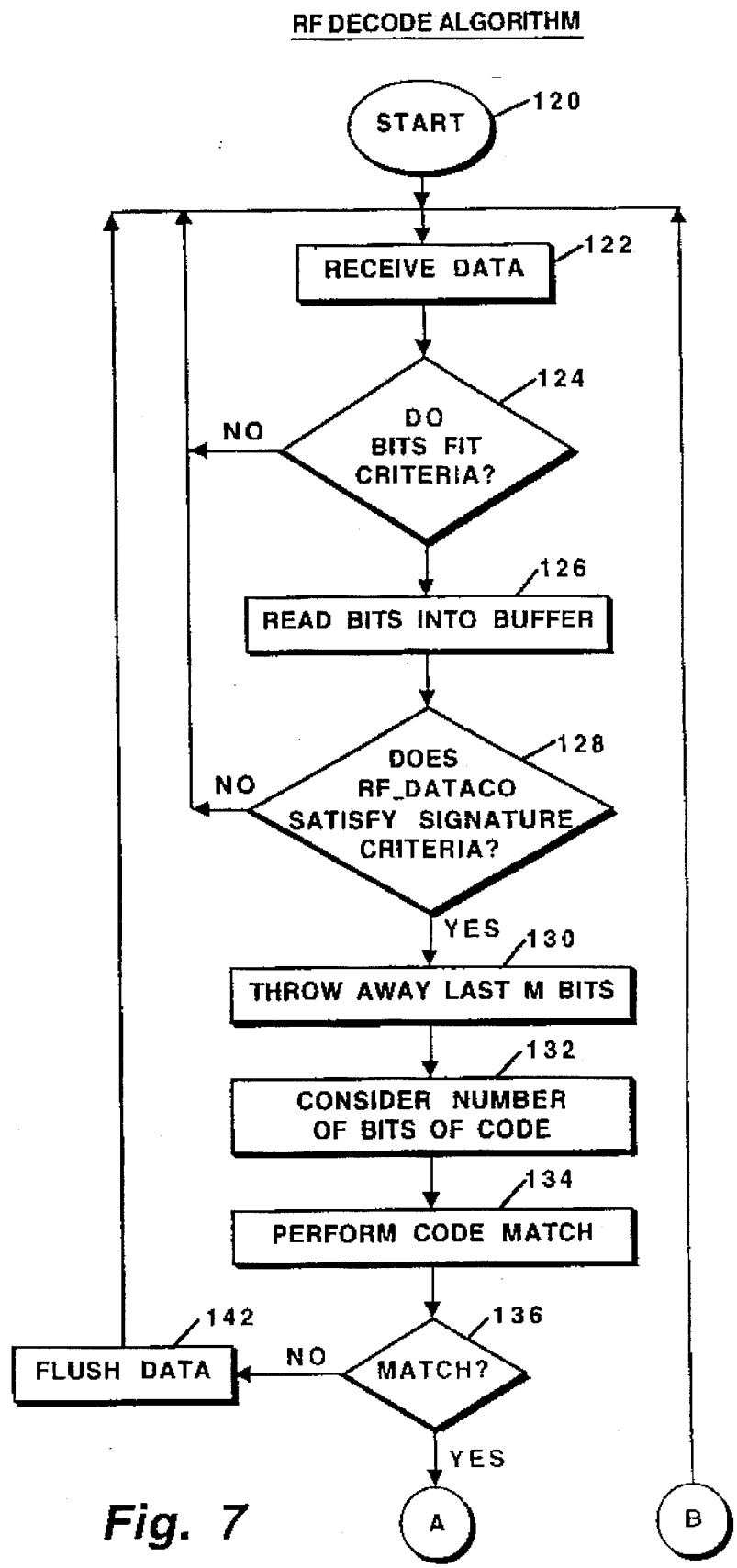

Referring now to FIG. 7, the RF decode algorithm performed by the RF decode processor 62 of controller 60 (FIG. 2) in response to the RF-DATA and RFDATACO signals is shown. The algorithm commences in process step 120, in response to receipt of an RF signal. Thereafter, the RF-DATA signal received by the controller 60 is stored in a memory device, such as a RAM internal to the controller 60. In process step 124, it is determined whether each bit of the received RF-DATA signal has a width within a predetermined range. If the received bit meets the bit width criteria of step 124, the bit is read into a buffer within the controller 60 in process step 126. Alternatively, if the bits do not have the widths within the predetermined range, then the controller 60 returns to process step 122 and continues to receive data, as shown.

Thereafter, in process step 128, it is determined whether the received bits have the format of a transmitted data burst shown in FIG. 4 (i.e., commencing with a start bit, followed by an N bit user code, and further followed by four status bits associated with the remote control functions). The way in which this determination is made is by detecting when the RFDATACO signal has been in a logic low state for a predetermined duration, such as three milliseconds, as described above. Once the RFDATACO signal indicates the receipt of a digital word meeting the criteria of a transmitted data burst, process step 130 is performed. Alternatively, until the RFDATACO signal indicates the receipt of a digital word meeting the criteria of a transmitted data burst, process steps 122-128 are repeated, as shown.

In response to a determination that the received data is of the predetermined format, M bits of the stored RF-DATA signal, such as four bits, corresponding to the three milliseconds that the RFDATACO signal remained in a logic low state after receipt of the transmitted data burst, are flushed from the buffer, or ignored, in step 130. In process step 132, the number of bits of the predetermined coding format preceding the ignored bits are considered. For example, where the predetermined format includes a start bit, followed by an N=sixteen bit user code, and four status bits, the twenty-one bits preceding the ignored M bits are considered in step 132. In step 134, the user code bits are compared to the learned user code stored in EEPROM 94. If the received user code and the stored user code do not match, process step 142 is performed in which the stored RF-DATA signal is removed from memory, following which the controller 60 returns to process step 122 to receive data, as shown.

Alternatively, if the received and stored user codes match, it is next determined in step 138 (FIG. 7A) whether the appropriate user code bits of a subsequently received digital word match the stored user code. More particularly, to ensure that the received data was transmitted by the corresponding remote 40, the process of comparing the received user code to the stored user code is performed twice, on two consecutive received digital words having the predetermined format.

Figure 8:
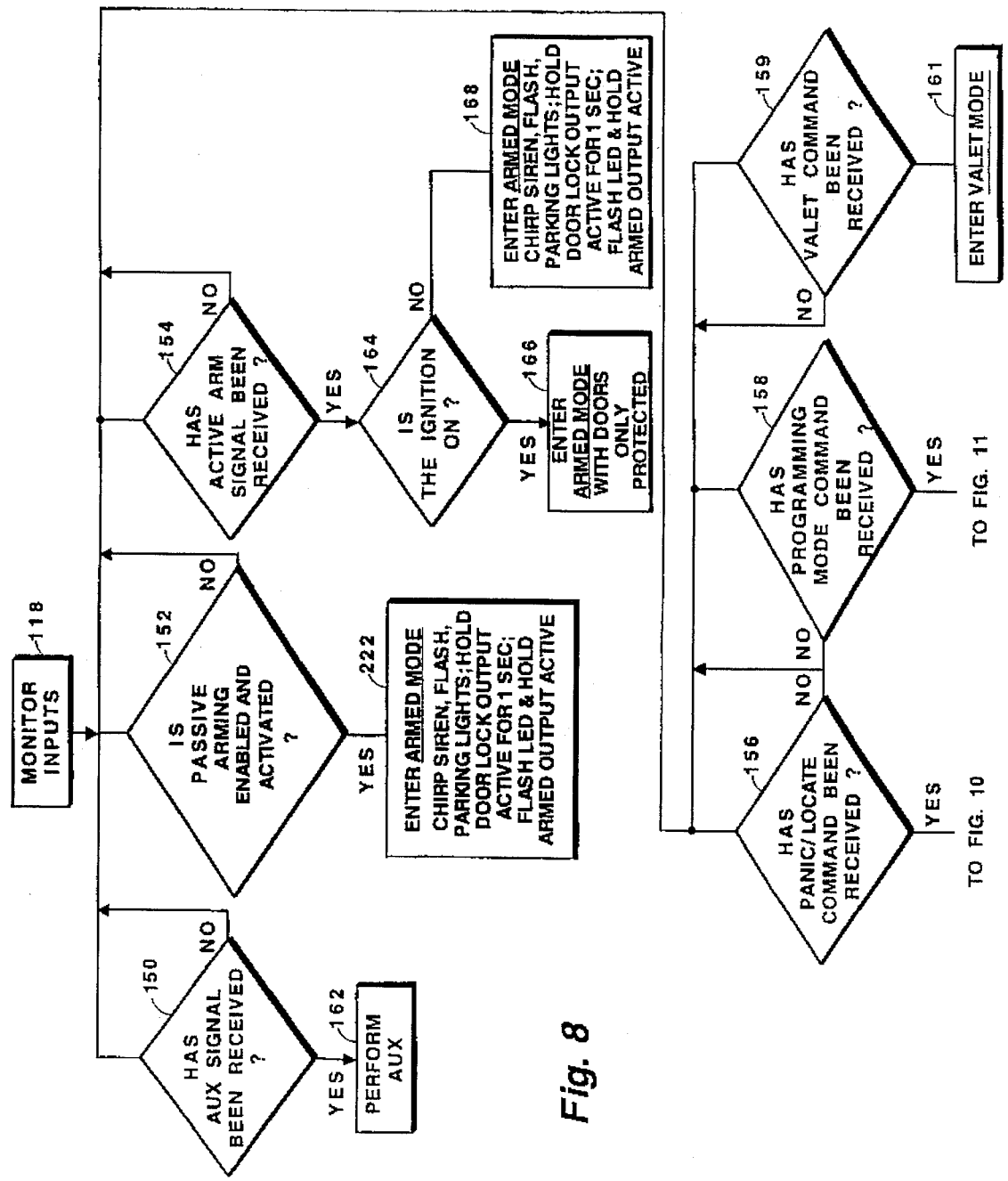
FIG. 8 is a flow diagram of processing steps performed by the Vehicle Security System controller of FIG. 2 while monitoring the system inputs.

Referring now to FIG. 8, processing steps of the vehicle security system controller 60 are shown. The inputs to the vehicle security system 10 (i.e., the sensor outputs and the RF input) are monitored in step 118 by reading the ports of the microprocessor 60. As the inputs are monitored in step 118, it is determined whether an auxiliary signal, or command has been received from the remote control 40 in process step 150, whether the passive arming capability has been enabled and activated in process step 152, whether an active arming signal has been received in process step 154, whether a panic/vehicle locate command has been received in process step 156, whether a programming mode command has been received in process step 158, or whether a valet command has been received in step 159. More particularly, the auxiliary signal monitored in step 150 is received from the remote control 40 and specifically is received upon actuation of the auxiliary control 58 in the above described manner, such as by two actuations of the control 58 within three seconds. Likewise, the active arm signal is received from the remote control 40 in response to actuation of the arm/disarm control 56 and the panic/vehicle locate command is received from the remote control 40 in response to actuation of the panic/locate control 54.

In response to receipt of an auxiliary command in process step 150, the auxiliary feature 36 is activated in process 162, as shown. As noted above, the auxiliary feature is operable in either the armed or disarmed modes of operation. Conventional security systems having an auxiliary feature capability either disable the auxiliary feature during the armed mode of operation since activation of the feature is likely to trigger the alarm (i.e., such as where the auxiliary feature is the trunk switch 30) or alternatively, the auxiliary feature is operable during the armed mode, but its activation causes the system to disarm, thereby requiring subsequent arming to effectuate vehicle security. In the present system, upon receipt of the auxiliary command, the controller 60 determines which sensor(s) is thereby activated and ignores such activated sensor(s) while still protecting the other sensors. For example, where the auxiliary feature 36 is the trunk switch 30 which causes the NEGTRIG signal to be active, the controller ignores the NEGTRIG signal but continues to monitor the shock sensor 44 and the door switch 26. This arrangement is desirable since it prevents unintentional activation of the alarm when utilizing the auxiliary feature and avoids requiring the system to be re-armed in response system de-arming as a result of auxiliary feature activation. If an auxiliary signal is not received in process step 150, then the controller 60 returns to process step 118 in which the system inputs are monitored.

If an active arming signal is received in process step 154, then it is determined whether the ignition 22 is on in step 164. If the ignition 22 is on, then process step 166 is subsequently performed in which a modified armed mode of operation is entered, with the doors only protected (i.e., with the vehicle doors locked and the door switch 26 being the only sensor monitored and capable of causing an alarm condition). This feature is desirable since, generally, if the ignition 22 is on and the system is armed, certain ones of the sensors will falsely indicate an intrusion condition (i.e., such as the shock sensor 44 and the perimeter sensor 42). If however in process step 164, it is determined that the ignition 22 is turned off, the armed mode is entered in the manner of process step 168. Specifically, in step 168, the siren 48 is activated to provide a chirp sound, the parking lights 14 are flashed, the door lock activating signal (i.e., the LOCK signal of FIGS. 2, 2A, 3, and 3A) is held active for a predetermined duration, sufficient to lock the car doors, the LED display 46 is flashed, and the ARMED output signal of the security system 10 is activated. If however in process step 154 the active arm signal is not received, the controller 60 returns to step 118 in which the system inputs are monitored.

If a panic/locate signal is received in process step 156, the panic/locate mode of operation of the security system 10 is entered, the steps of which are described below in conjunction with FIG. 10. Alternatively, if a panic/locate command is not received, the controller 60 again returns to step 118 in which the system inputs are monitored.

Figure 11:
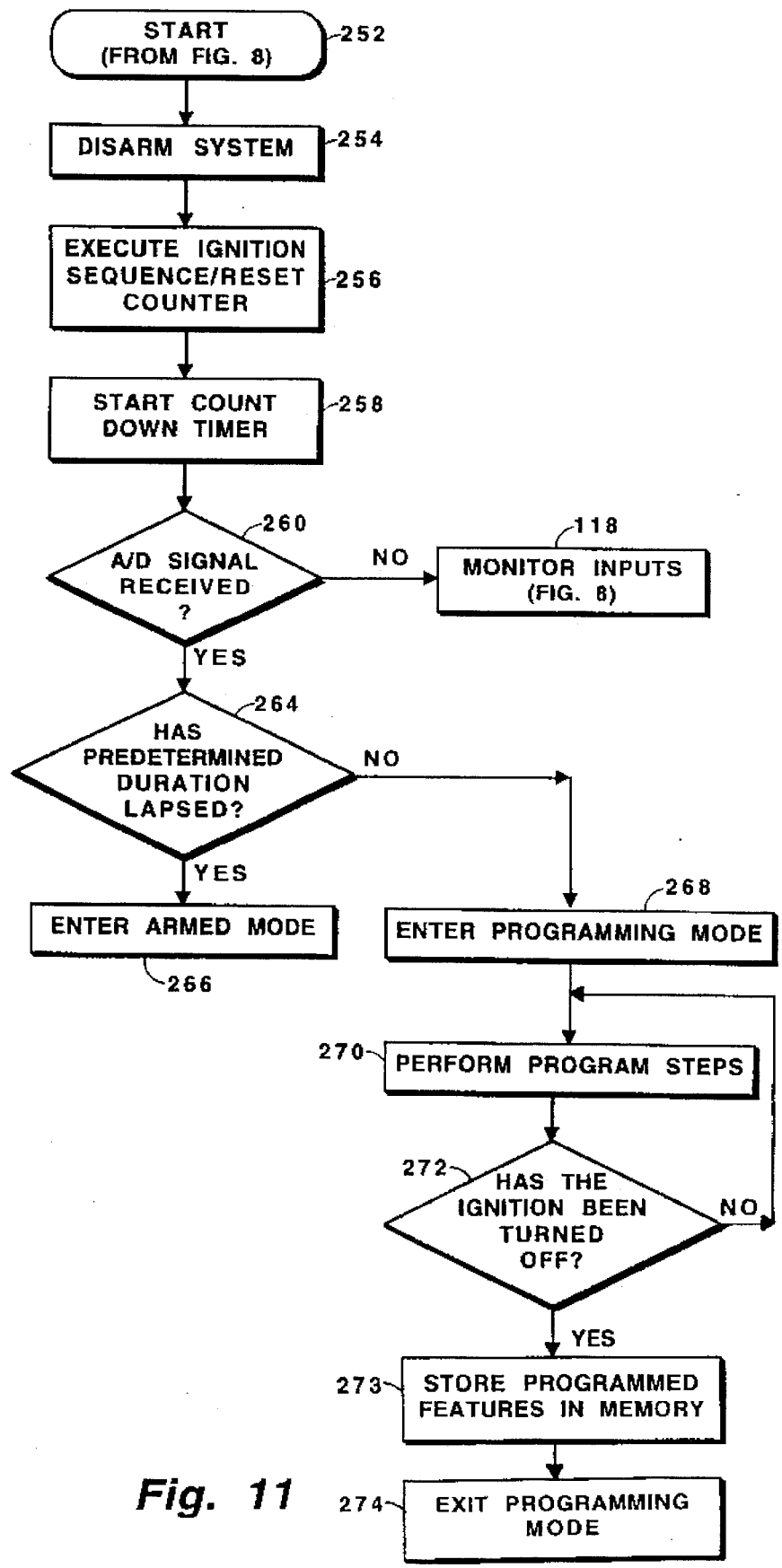
FIG. 11 is a flow diagram of processing steps performed by the programming processor of the Vehicle Security System controller of FIG. 2.

If a programming mode signal is received in process step 158, the programming mode of operation is entered in which the process steps described below in conjunction with FIG. 11 are performed. Alternatively, if a programming mode signal is not received in step 158, the controller 60 again returns to process step 118 to monitor the system inputs.

In process step 159, it is determined whether a valet mode command has been received, as is desirable when the vehicle 12 is left in the care of a valet. Specifically, a valet mode command is received in response to the system being disarmed, the ignition 22 being turned on, and the valet switch 50 being actuated for a predetermined duration during which the panic/locate control 54 is actuated. Entrance into the valet mode of operation, in step 161, is indicated by a predetermined display on LED display 46, such as the amber LED being activated. In the valet mode of operation, a modified armed mode is entered in which only the sensors coupled to the NEGTRIG signal (FIGS. 2, 2A, 3, and 3A) are protected (i.e., monitored and capable of generating an alarm). Additionally, in the valet mode, the arm/disarm control 56 and the aux control 58 of the remote control 40 are disabled, but the locate feature of the panic/locate control 54 is operative. Thus, a violation of the system in the valet mode cannot be terminated by activating the arm/disarm control 56, but only by disarming the system without the remote 40.

In process step 152, it is determined whether the passive arming feature has been enabled and activated. Passive arming is a feature whereby certain events or conditions automatically cause the system to enter the armed mode of operation once the feature is enabled. The steps comprising the determination of step 152 are described below in conjunction with FIGS. 9–9A. Suffice it here to say that if it is determined in step 152 that passive arming has been enabled and is activated, the armed mode of operation is entered in step 222 (see also FIG. 9A). Alternatively, if passive arming is not enabled and activated, the controller 60 returns to step 118, as shown.

Figure 8A:
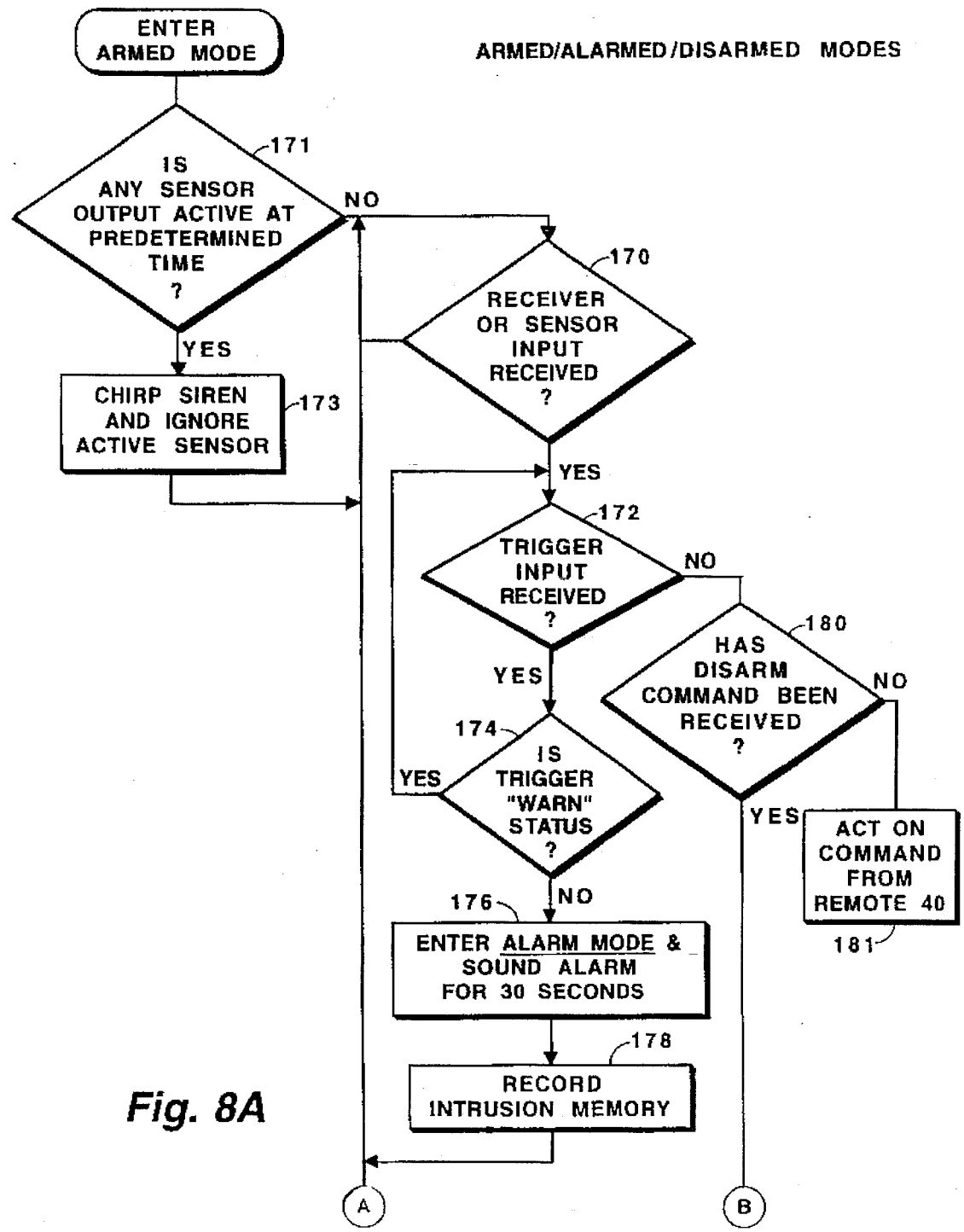
FIGS. 8A and 8B are a flow diagram of processing steps performed by the arm processor, the alarm processor, and the disarm processor of the Vehicle Security System controller of FIG. 2.
Figure 8B:
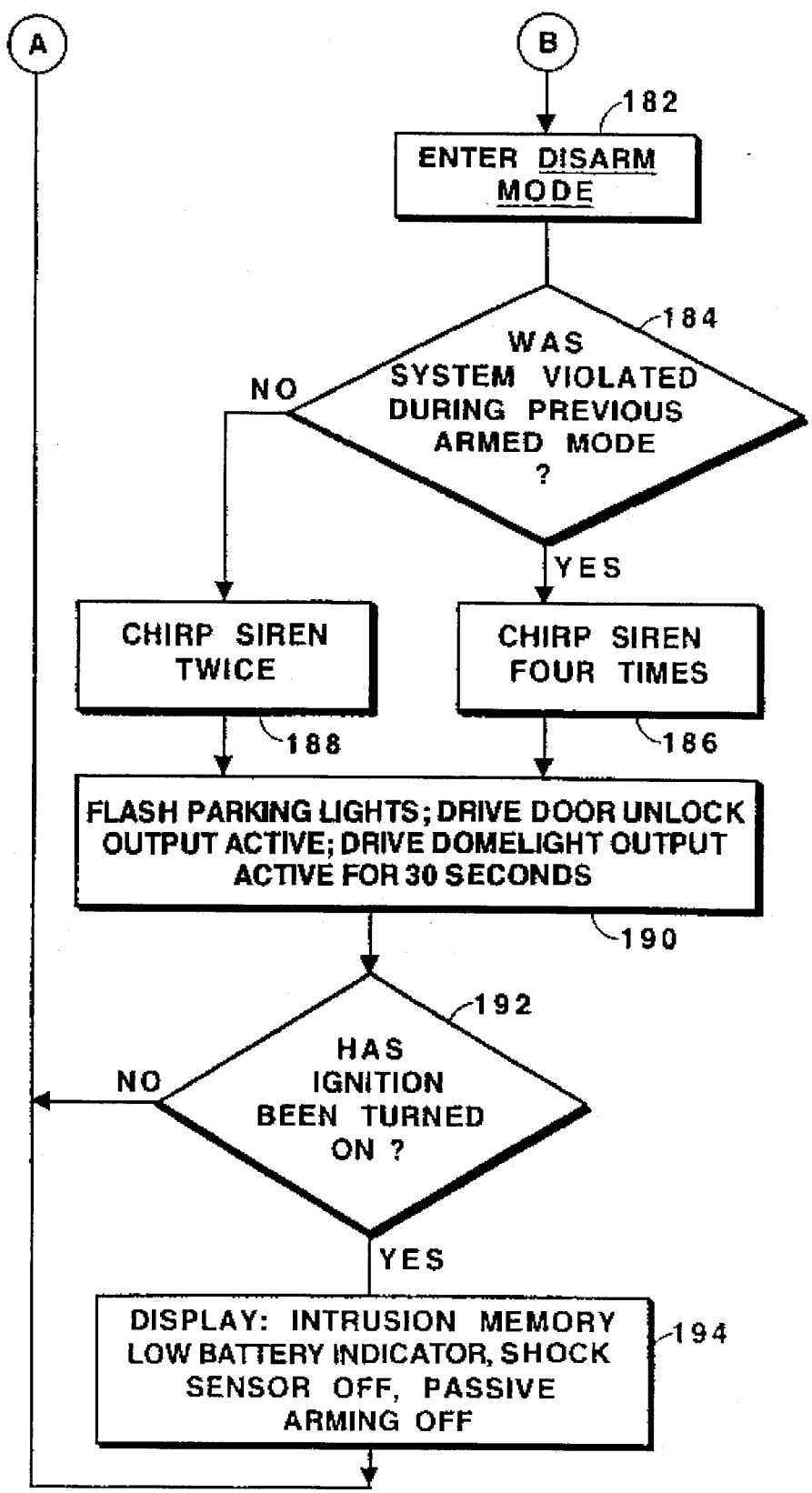

Referring now to FIG. 8A and 8B, the processing steps of the armed, alarmed, a disarmed modes of operation are shown. Initially, the armed mode is entered in the manner described above in conjunction with process steps 166, 168, 222, 161 (FIG. 8). However, the armed mode entered in steps 166 and 161 differs from the mode entered in steps 168 and 222, as described above. Specifically, in the armed mode of step 166, the door switch 26 only is protected and in the armed mode of step 161, the glove box switch 24, the trunk switch 30, and the hood switch 16 only are protected. The armed mode process steps of FIG. 8A and 8B correspond to a "fully" armed mode, as is entered in steps 168 and 222. However, it should be understood that these steps are modified when the armed modes of steps 161 and 166 are entered in accordance with the ones of the sensors which are protected therein.

In process step 171, it is determined whether any sensor output is active (i.e., in a state indicative of an intrusion) at a predetermined time after the armed mode is entered, such as four seconds. If a sensor output is active as determined in step 171, step 173 is thereafter performed in which the siren is activated to provide a chirp sound to alert the vehicle operator to the active sensor condition and the output of the active sensor is ignored. Note that the active sensor output is ignored until it is determined in step 173 that such output has transitioned to indicate a secure condition.

If none of the sensor outputs are active as determined in step 171, process step 170 is performed in which it is determined whether a receiver or sensor input has been received. Specifically, a receiver input is an RF input to the security system 10 from the remote control 40 and a sensor input is provided by either: the ignition 22, the door switch 26, the shock sensor 44, the trunk switch 30, the glove box switch 24, the hood switch 16, the additional sensor 34, the perimeter sensor 42, or the valet switch 50. Thereafter, in step 172 it is determined whether the input received is a trigger input. Trigger inputs are certain ones of the sensor inputs listed above which can cause the siren 48 to be sounded, either with a chirp or a longer duration alarm. Specifically, a trigger input may be provided by the ignition 22, the door switch 26, the shock sensor 44, the trunk switch 30, the glove box switch 24, the hood switch 16, the additional sensor 34, or the perimeter sensor 42.

If a trigger input is received, process step 174 is performed in which it is determined whether such received trigger input is a "warn" status input. The perimeter sensor 42 and the shock sensor 44 provide "warn" status inputs since an indication of an intrusion therefrom does not generate a full alarm. The "warn" status indication provided in response to activation of the perimeter sensor 42 is a chirp; whereas, the "warn" status indication resulting from activation of the shock sensor 44 is a brief siren blast, such as one cycle of the alarm pattern. Note however that the shock sensor 44 is a "warn" status input in response to at least one indication of a shock and, thereafter, in response to a subsequent shock indication, becomes a trigger input, capable of generating a full alarm. For example, shock sensor 44 may be a "warn" status input in response to one shock indication and become a trigger input capable of causing a full alarm in response to a second shock indication. If it is determined in process step 174 that the received trigger signal is not a "warn" status input, then the alarm mode is entered in process step 176 during which the siren 48 is sounded for a predetermined duration, such as for thirty seconds. The sounding of the siren in step 176 represents a full alarm condition, described above as occurring in response to the second siren control signal. Thereafter, in process step 178, the occurrence of the potential intrusion is stored in memory device 94, after which the controller 60 returns to process step 170, as shown.

If a trigger input is not received in process step 172, then a receiver input was received in step 170 and it is thereafter determined in process step 180 whether the receiver input is a disarm command from the remote control 40. If a disarm command has not been received, then the command received from the remote 40 (i.e., actuation of the aux control 58 or the panic/locate control 54) is processed and acted upon in step 181. Alternatively, if a disarm command is received in step 180, the disarm mode is entered in step 182, as follows.

Initially, it is determined in process step 184 whether the security system 10 detected a violation or intrusion during the previous armed mode of operation. More specifically, the controller 60 reads the previous system status from memory device 94. If it is determined in step 184 the system 10 was violated during the previous armed mode, process step 186 is performed in which the siren 48 chirps a first predetermined number of times, such as four. Alternatively, if it is determined in step 184 that the system 10 was not violated during the previous armed mode, then the siren 48 chirps a second predetermined, lesser number of times, such as twice. In this way, the vehicle operator is alerted to the previous status of the system. This feature gives the car operator an opportunity to seek assistance rather than enter the car, such as may be desirable when the system was previously violated. For example, upon disarming the car while approaching it, if the siren chirps four times indicating that an intruder attempted to enter the car, it may be preferable to seek assistance before approaching the car.

After steps 186, 188 the parking lights 14 are flashed, the door lock controller output signal ULOCK is activated to unlock the car doors, and the dome light controller output signal DOME is activated for a predetermined duration, such as thirty seconds, in process step 190. The flashing of the parking lights 14 and the thirty second activation of the dome light 32 indicate to the operator that the vehicle 12 has entered a disarmed mode of operation. Thereafter, in process step 192, it is determined whether the ignition 22 has been turned on. If the ignition 22 has been turned on, process step 194 is then performed in which the LED display 46 indicates the status of the intrusion memory 94 and the remote control battery in step 194. Additionally, the shock sensor 44 is turned off and the passive arming is disabled, after which the controller 60 returns to process step 170, as shown. Likewise, if it is determined in step 192 that the ignition 22 has not been turned on, again the controller 60 returns to process step 170.

Figure 9:
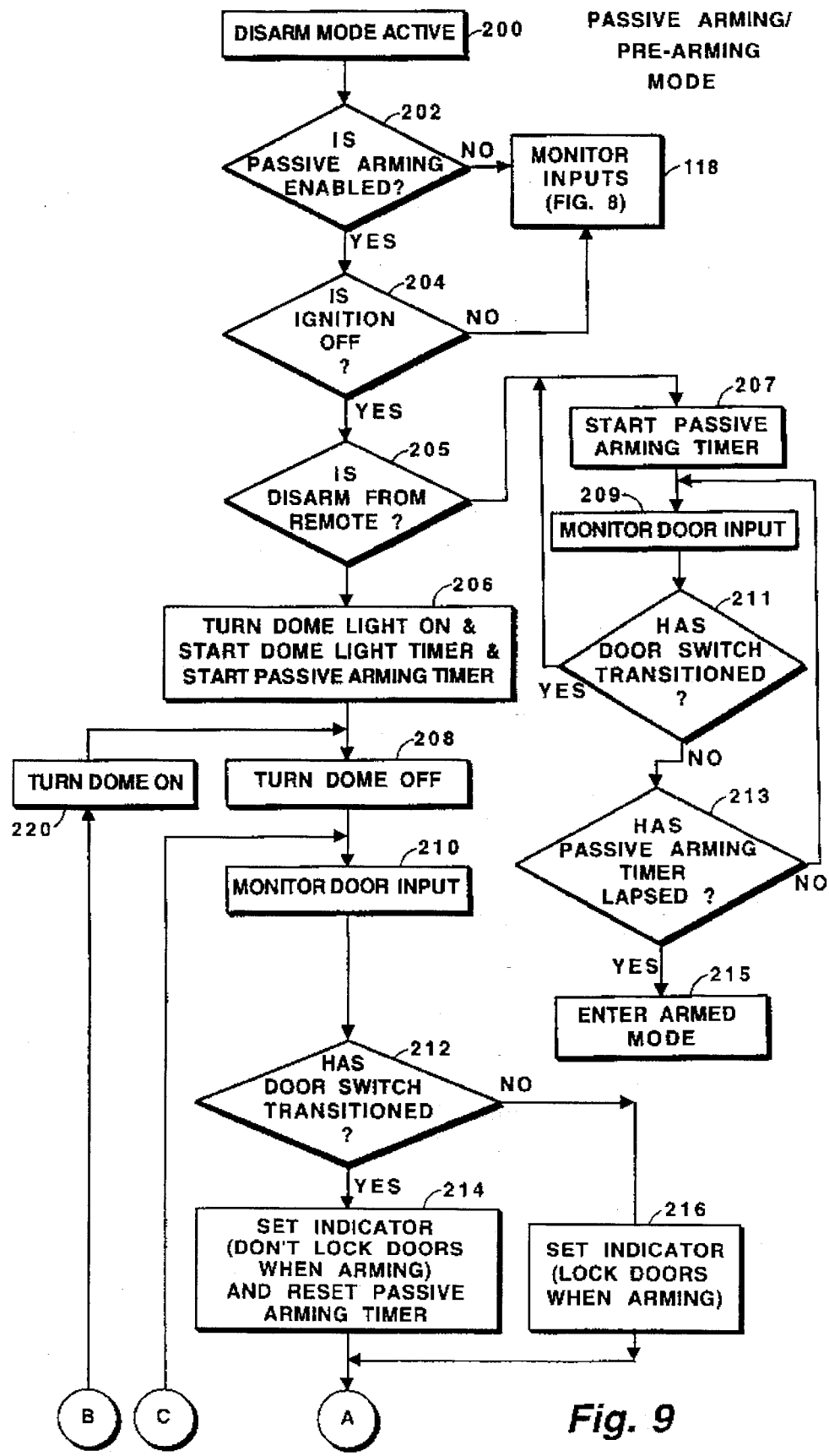
FIGS. 9 and 9A are flow diagrams of processing steps performed by the passive arm and pre-arming processor of the Vehicle Security System controller of FIG. 2.
Figure 9A:
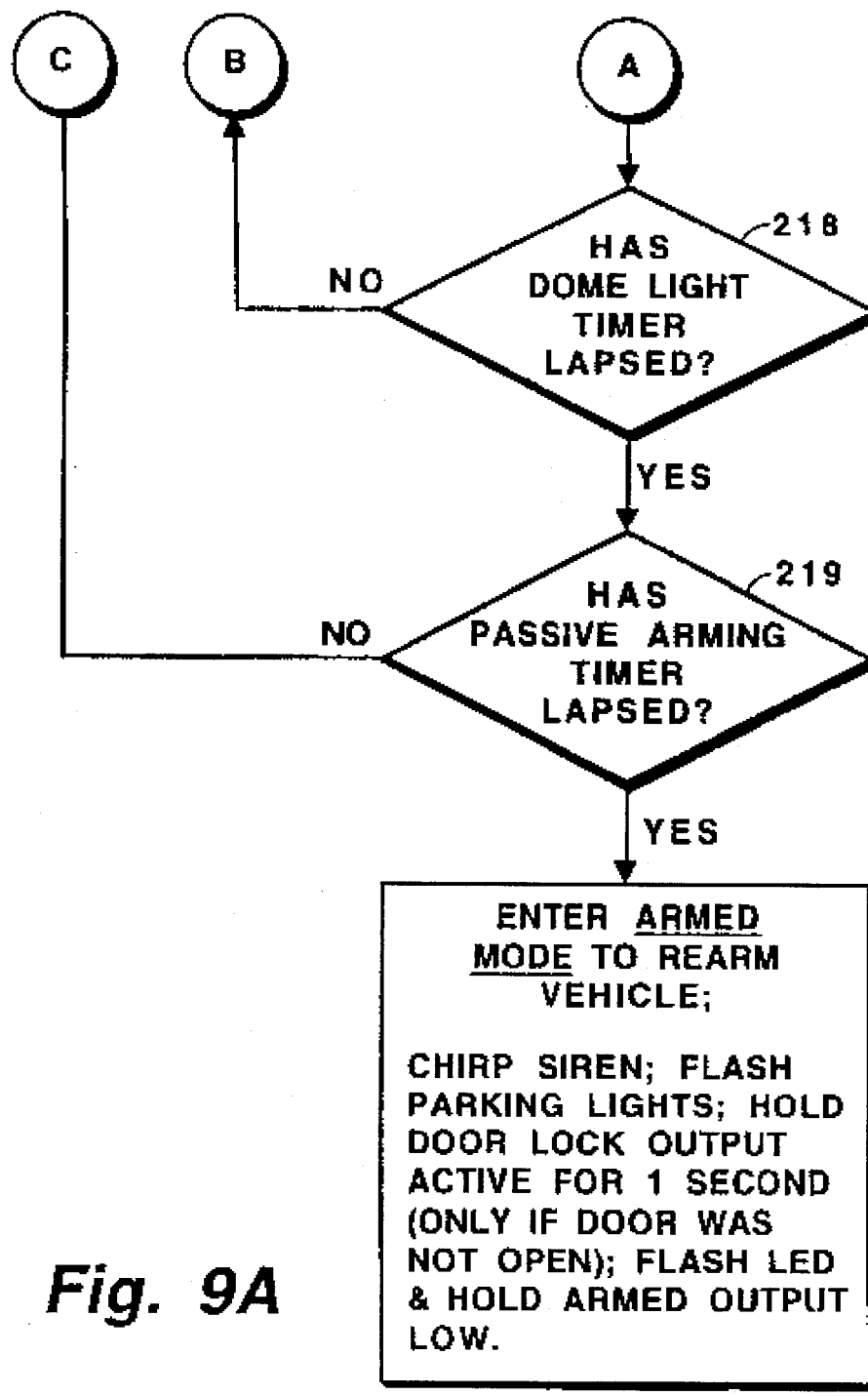

Referring now to FIGS. 9 and 9A, the operation of the pre-arming/passive arming processor 74 (FIG. 2) commences from the disarm mode of operation in step 200. In step 202, it is determined whether passive arming is enabled, as described below in conjunction with FIG. 11. Suffice it here to say that passive arming is one of the features of the security system 10 that is programmable, either to be enabled or disabled. If passive arming is enabled, the occurrence of one of two sets of conditions causes the system 10 to passively enter the armed mode. In accordance with a first manner of passively arming the vehicle, if a predetermined duration, such as thirty seconds, lapses after the ignition 22 is turned off, then the system 10 passively enters the armed mode. In accordance with a second manner of passively arming the vehicle, if a predetermined duration, such as thirty seconds, lapses after a remote disarm command is received and the ignition 22 is turned off, then the system passively enters the armed mode of operation. If passive arming is not enabled, as determined in step 202, then the system inputs are monitored in step 18, as shown.

To this end, the pre-arming mode of operation is entered once it is determined in step 202 that passive arming is enabled. That is, the pre-arming mode of operation refers to the steps of FIGS. 9 and 9A by which the system is passively armed. Upon entering the pre-arming mode, it is determined, in step 204, whether the vehicle ignition 22 is turned off. If the ignition 22 is not turned off, as determined in step 204, then the system inputs are thereafter monitored in step 118. If however the ignition 22 is turned off, it is thereafter determined in step 205 whether the system was disarmed via the remote control 40. If the system was disarmed with the remote 40, then step 206 is performed in accordance with the second manner of passively arming the system. Alternatively, if it is determined in step 205 that the system was not disarmed from the remote 40, step 207 is performed in accordance with the first manner of passively arming the system.

In step 206, the dome light 32 is turned on, a passive arming timer (i.e., a time which indicates a predetermined duration such as thirty seconds) is initialized, and a dome light timer (i.e., a second timer which indicates a predetermined duration, such as thirty seconds) is initialized. Thereafter, in step 208, the dome light 32 is turned off, following which the door switch input is monitored in step 210. If it is determined, in process step 212, that the door switch output has transitioned indicating that a door has been opened, then an indicator is set by the controller 60 to ensure that the doors are not locked when the security system 10 is next armed and the passive arming timer is reset, as indicated in step 214. Alternatively, if it is determined in step 212 that the door switch output has not transitioned, indicating that none of the doors has been opened, a different indicator is set by the controller 60 in step 216 to ensure that the vehicle doors are locked when the system 10 is next armed. After the indicator of either step 214 or step 216 is set, process step 218 is performed (FIG. 9A) in which it is determined whether the dome light timer, initialized in step 206, has lapsed. If the dome light timer has not lapsed, then the dome light 32 is turned on in step 220 and the controller 60 returns to process step 208, as shown. Alternatively, if the dome light timer has lapsed, it is thereafter determined in step 219 whether the passive arming timer has lapsed. If the passive arming timer has not lapsed, the controller 60 returns to step 210, as shown. Alternatively, if the passive arming timer has lapsed, then the pre-arming mode of operation terminates and the armed mode of operation is entered in step 222 to passively arm the vehicle. As the armed mode is entered, the siren 48 chirps, the parking lights 14 flash, and, if it was determined in step 212 that the door switch output transitioned and the indicator of step 214 was set, then the door lock controller output signal (i.e., LOCK) is held active for a predetermined period of time to lock the car doors. Additionally, the LED display 46 flashes to indicate that the armed mode has been entered and the ARMED output signal of the controller 60 is held active. This arrangement of periodically turning off the dome light and sensing the door switch output, as well as locking the doors if the door switch output has not transitioned, ensures that loss of protection does not occur unintentionally, such as may occur when the arm/disarm control 56 of the remote is accidentally actuated.

As noted above, if it is determined in process step 205 that a disarm command was not received from the remote 40, step 207 is performed in which the passive arming timer is initialized. Thereafter, in step 209 the door switch input is monitored following which it is determined in step 211 whether the door switch output has transitioned. If the door switch output has transitioned indicating either that a door has been opened or closed, then the controller 60 returns to process step 207 to reset the passive arming timer. If however the door switch output has not transitioned, step 213 is performed in which it is determined whether the passive arming timer has lapsed. If the passive arming timer has lapsed, then the pre-arming mode is terminated and the armed mode is passively entered in step 215. Alternatively, if the passive arming timer has not lapsed, the controller 60 returns to step 209, as shown. Note however that the armed mode of step 215 is modified from that of step 222 in that the vehicle doors will not be locked in step 215. That is, recall that by entering the armed mode in step 222, the door may be locked depending on whether a door switch output transitioned as determined in step 212.

Figure 10:
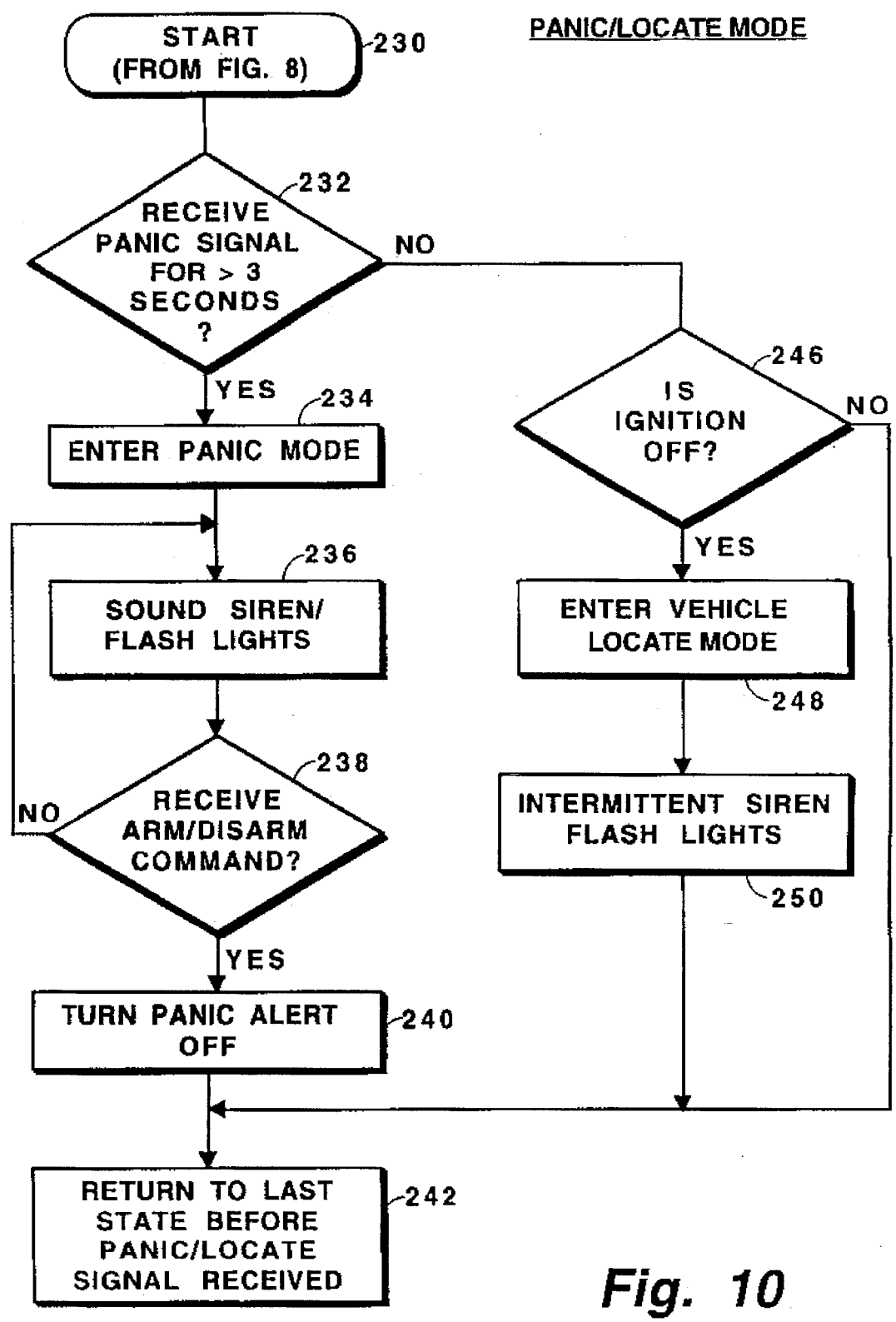
FIG. 10 is a flow diagram of processing steps performed by the Panic/Locator processor of the Vehicle Security System controller of FIG. 2.

Referring now to FIG. 10, the panic/locate mode of operation commences in step 230 which corresponds to the monitor inputs step 118 of FIG. 8. As the security system inputs are monitored, it is determined whether the panic/locate control 54 on the remote control 40 has been actuated in the second manner referred to above, namely by continuous actuation for greater than a predetermined duration, such as three seconds. Actuation of the panic/locate control 54 in this manner constitutes receipt of a panic signal in step 232. In response to receipt of the panic signal in step 232, the panic mode of operation is entered in step 234. As mentioned, in the panic mode, the siren 48 is sounded for a predetermined duration and the parking lights 14 are flashed, as indicated in step 236.

More particularly, in the panic mode of operation, the siren 48 is sounded indefinitely, until the arm/disarm control 56 is activated (or the system 10 is disarmed without the remote). To this end, it is determined in step 238 whether the arm/disarm control 56 of the remote control 40 has been activated. If control 56 has been activated, then the panic alert is turned off by de-activating the siren 48 and the parking lights 14, in process step 240. Alternatively, the controller 60 returns to process step 236 and continues to sound the alarm 48 and flash the parking lights 14. After step 240, the controller 60 returns to the last state, or mode of operation, before the panic signal was received, in step 242, by reading the previous system status from memory device 94.

If it is determined in process step 232 that the panic/locate control 54 of the remote control 40 was actuated for less than the predetermined duration, then process step 246 is performed, in which it is determined whether the ignition 22 is turned off. If the ignition 22 is turned off, then the vehicle locate mode of operation is entered in step 248. Thereafter, the siren 48 is sounded intermittently, such as for a series of three, one second siren bursts and the parking lights 14 are flashed, as indicated in step 250. If however, it is determined that the ignition 22 is turned on in step 246, then the controller 60 skips to process step 242 in which the last mode of operation, before the panic/locate control 54 actuation, is resumed. It is desirable to permit the locate mode of operation to be entered only if the ignition 22 is turned off in order to avoid sounding the siren 48 in response to an unintentional actuation of the control 54.

Referring now to FIG. 11, process steps performed by the programming processor 72 (FIG. 2) of the controller 60 are shown to commence in step 252. More particularly, steps 252-256 correspond to the determination step 158 in FIG. 8. That is, a programming mode command includes disarming the vehicle in step 254 and executing an ignition sequence in step 256. Disarming the vehicle is achieved either by actuating the arm/disarm control 56 of the remote control 40 or by disarming without remote, as described above. Thereafter, in step 256, the operator executes a second predetermined ignition sequence, associated with entering the programming mode. One illustrative ignition sequence is turning the vehicle ignition 22 on, off, on, off, and on.

In response to the system 10 being disarmed in step 254 and the specified ignition sequence being performed in step 256, a timer is initialized to count down to a predetermined value corresponding to a predetermined duration in process step 258. Programming of the system 10 consists of sequencing through a plurality of programmable features in response to a sequencing signal, such as may be generated by actuation of the valet switch 50 and selecting a predetermined choice or option associated with a particular feature in response to a selection signal, such as by actuation of the arm/disarm control 56 of the remote control 40. To this end, it is determined in step 260 whether the arm/disarm signal is received (i.e., whether the control 56 has been actuated). If the arm/disarm signal is not received in step 260, then the security system inputs are again monitored in step 118, as indicated.

Alternatively, if an arm/disarm signal is received in step 260, then it is next determined in step 264 whether a predetermined duration, such as five seconds, has lapsed from step 258 in which the timer was initialized. If the predetermined duration has lapsed between steps 258 and 264, process step 266 is then performed in which the armed mode of operation is entered (FIG. 8A and 8B). This contingency occurs if the operator decides not to program the system after having disarmed the system in step 254 and executed the specified ignition sequence in step 256. If however, it is determined in step 264 that the predetermined duration has not lapsed, then step 268 is performed and the programming mode of operation is entered.

In step 270, the programming steps are performed. Specifically, actuation of the valet switch 50 causes the controller 60 to sequence through the plurality of programmable features including: passive arming, shock sensor programming, perimeter sensor programming, audio alarm programming, chirp volume programming, diagnostics programming, and door lock timing. Each of these programmable features has a corresponding plurality of predetermined choices or options associated therewith, the selection of which is achieved by actuation of the arm/disarm control 56 of the remote control 40. Specifically, programming passive arming consists of selection of enabling passive arming or disabling passive arming. Likewise, programming of the shock sensor and the perimeter sensor consist of selecting either enablement of disablement thereof. The audio alarm programming feature has six choices associated therewith, each one corresponding to a different sequence of patterns comprising the alarm. The chirp volume is programmed by selecting one of eight options for chirp volume. The diagnostics programming feature has five selections associated therewith corresponding to different diagnostic routines.

In the diagnostic mode of operation, the operability of the sensors can be verified and the sensitivity of certain sensors tuned. Sensors having adjustable sensitivity include the perimeter sensor 42 and the shock sensor 44. During the diagnostic mode of operation, the controller 60 input ports are monitored selectively, to determine whether a particular, monitored input indicates an intrusion condition. Stated differently, during the diagnostic mode of operation, the input ports to the controller 60 are isolated so that the operability of each sensor can be individually verified. For example, when verifying the operation of the shock sensor 44, such as by kicking a tire on the car, isolation of the controller inputs ensures that false operability is not indicated due to triggering the perimeter sensor 42.

To this end, different diagnostic routines are available. One diagnostic routine corresponds to verifying each of the sensors associated with the car; whereas other diagnostic routines correspond to verifying the operation of a specific one, or ones, of the sensors, such as the shock sensor, the hood switch 16, trunk switch 30, and glove box switch 24, the door switch 26, or the perimeter sensor 42.

The programmable door lock timing refers to a predetermined duration for holding the door output signals of the controller 60 active (i.e., the LOCK and ULOCK signals). Programmable door lock timing enables this duration to be customized in accordance with the particular type of door locks on the car 12. For example, cars having vacuum activated door locks require longer to lock than electrical door locks.

Also during the programming step 270, the LED display 46 is activated to assist the vehicle operator by indicating the present location of the system within the programming sequence. The Table below illustrates an exemplary manner of indicating the present step within the programming sequence with corresponding sequences of activation of the red LED and the green LED, to provide a red light, a green light, or an amber light, represented in the following Table by R, G, and A, respectively.

TABLE

| Programmable Feature | Selection | LED display sequence |
|---|---|---|
| Passive Arming | Enable | 1A-1G |
| | Disable | 1A-1R |
| Shock Sensor | Enable | 2A-1G |
| | Disable | 2A-1R |
| Perimeter Sensor | Enable | 3A-1G |
| | Disable | 3A-1R |
| Alarm | Selection 1 | 4A-1G |
| | Selection 2 | 4A-2G |

TABLE-continued

| Programmable Feature | Selection | LED display sequence |
|---|---|---|
| | Selection 3 | 4A-3G |
| | Selection 4 | 4A-4G |
| | Selection 5 | 4A-5G |
| | Selection 6 | 4A-6G |
| Chirp Volume | Volume 1 | 5A-1G |
| | Volume 2 | 5A-2G |
| | Volume 3 | 5A-3G |
| | Volume 4 | 5A-4G |
| | Volume 5 | 5A-5G |
| | Volume 6 | 5A-6G |
| | Volume 7 | 5A-7G |
| | Volume 8 | 5A-8G |
| Diagnostics | Routine 1 - All sensors | 6A-1G |
| | Routine 2 - Shock sensor | 6A-2G |
| | Routine 3 - Negative trigger | 6A-3G |
| | Routine 4 - Door | 6A-4G |
| | Routine 5 - Perimeter | 6A-5G |
| Door Lock Timing | one second | 7A-1G |
| | four seconds | 7A-1R |

In step 272 it is determined whether the ignition 22 has been turned off. If the ignition is turned off, then programmed features are stored in memory device 94 in process step 273, as shown. Thereafter, the programming mode is exited in step 274. Note that until the ignition 22 is turned off, the programming steps of step 270 are continuously performed, as shown.

Having described the preferred embodiments of the invention, it will be apparent to one of skill in the art that other embodiments incorporating their concepts may be used. Accordingly, the invention should be limited only by the spirit and scope of the appended claims.

We claim:

1. A vehicle security system comprising:

a plurality of sensors, each one corresponding to a condition of a vehicle on which said system is installed and providing a sensor output signal indicative of said vehicle condition;

a controller operable in an armed mode of operation in which each said plurality of sensor output signals are monitored for an intrusion indicating condition and a disarmed mode of operation in which each of said sensor outputs are not monitored for said intrusion indicating condition, said controller having a plurality of programmable features, each one having a corresponding plurality of selections associated therewith, said controller being responsive to a sequencing signal for sequencing through said plurality of programmable features and a selection signal for choosing one of said plurality of selections;

a display providing a different indication corresponding to each of said plurality of selections of each of said plurality of programmable features; and a remote control operable for communication with said controller and having a control for selecting said armed mode of operation and said disarmed mode of operation, wherein said control also generates said selection signal.

2. A vehicle security system comprising:

a plurality of sensors, each one corresponding to a condition of a vehicle on which said system is installed and providing a sensor output signal indicative of said vehicle condition;

a controller operable in an armed mode of operation in which each said plurality of sensor output signals are monitored for an intrusion indicating condition and a disarmed mode of operation in which each of said sensor outputs are not monitored for said intrusion indicating condition, said controller having a plurality of programmable features, each one having a corresponding plurality of selections associated therewith, said controller being responsive to a sequencing signal for sequencing through said plurality of programmable features and a selection signal for choosing one of said plurality of selections;

a display providing a different indication corresponding to each of said plurality of selections of each of said plurality of programmable features; and a siren for providing a chirp sound and an alarm sound, wherein said plurality of programmable features includes an adjustable chirp volume feature having a corresponding plurality of selections comprising different chirp volumes, and a selectable alarm sound feature having a corresponding plurality of selections comprising different alarm sounds.

3. The vehicle security system recited in claim 1 wherein said plurality of programmable features includes a perimeter sensor enablement feature having a corresponding plurality of selections comprising enablement and disablement of said perimeter sensor.

4. The vehicle security system recited in claim 2 further comprising a shock sensor coupled to said vehicle for providing a shock sensor output signal indicative of an impact experienced by said vehicle, said controller activating said siren in response to said shock sensor output signal, wherein said plurality of programmable features includes a shock sensor enablement feature having a corresponding plurality of selections comprising enablement and disablement of said shock sensor.

5. The vehicle security system recited in claim 4 wherein said alarm is activated to provide a warning in response to at least one impact indication by said shock sensor output signal and is activated to provide an alarm sound in response to a subsequent impact indication by said shock sensor output signal.

6. The vehicle security system recited in claim 1 wherein said armed mode of operation is entered actively in response to actuation of an armed control or passively in response to the occurrence of a predetermined condition when a passive arming feature is enabled, wherein one of said plurality of programmable features includes a passive arming enablement feature having a corresponding plurality of selections comprising enablement and disablement of said passive arming feature.

7. A vehicle security system comprising:

a plurality of sensors, each one corresponding to a condition or a vehicle on which said system is installed and providing a sensor output signal indicative of said vehicle condition;

a controller operable in an armed mode of operation in which each said plurality of sensor output signals are monitored for an intrusion indicating condition and a disarmed mode of operation in which each of said sensor outputs are not monitored for said intrusion indicating condition, said controller having a plurality of programmable features, each one having a corresponding plurality of selections associated therewith, said controller being responsive to a sequencing signal for sequencing through said plurality of programmable features and a selection signal for choosing one of said plurality of selections; and a display providing a different indication corresponding to each of said plurality of selections of each of said plurality of programmable features;

wherein said controller is operable in a diagnostic mode of operation in which said sensor output signals are monitored to verify operability of said sensors and wherein one of said plurality of programmable features is a diagnostic mode feature having a plurality of selections comprising different diagnostic routines in which different ones of said sensor output signals are monitored to verify operability.

8. The vehicle security system recited in claim 1 wherein said vehicle has a door lock and one of said plurality of programmable features includes a programmable door lock timing feature having a plurality of selections comprising different time intervals for locking and unlocking said door lock.

9. A vehicle security system comprising:

a sensor for sensing a condition associated with said vehicle and for providing an output signal indicative of said condition:

a controller responsive to an operational mode command when said controller is in a first state for entering an armed mode of operation, said controller receiving said sensor output signal and providing a first siren control signal when said security system is in said armed mode of operation and said sensor output signal is indicative of an intrusion and providing a second siren control signal in response to said operational mode command;

a siren, receiving said first and second siren control signals and providing a chirp sound having a predetermined volume in response to said second siren control signal and at least one pattern in response to said first siren control signal; and a remote control in communication with said controller for generating said operational mode command, wherein said chirp volume is adjusted in response to said operational mode command when said controller is in a second state.

10. A vehicle security system comprising:

a sensor for sensing a condition associated with said vehicle and for providing an output signal indicative of said condition;

a controller responsive to an operational mode command for entering an armed mode of operation in which said sensor output signal is monitored for an intrusion indicating condition, said controller providing a first siren control signal when said security system is in said armed mode of operation and said sensor output signal is indicative of said intrusion indicating condition, wherein said controller provides a second siren control signal in response to said operational mode command;

a siren receiving said first and second siren control signals and providing a chirp sound having a predetermined volume in response to said second siren control signal and at least one pattern in response to said first siren control signal, wherein said at least one pattern is operator-selectable from a plurality of patterns including different alarm sounds; and a remote control in communication with said controller for generating said operational mode command, wherein said at least one pattern is selectable in response to a programming signal generated by said remote control.

11. The vehicle security system recited in claim 10 wherein said at least one pattern comprises a sequence of patterns.

12. A vehicle security system comprising:

a controller for providing a first siren control signal in response to a condition of said vehicle being indicative of an intrusion;

a siren responsive to said first siren control signal for providing an alarm sound, said alarm sound having a first predetermined duration; and a remote control having a control actuable to communicate with said controller, said remote control providing a locate signal in response to a first manner of actuation of said control and a panic signal in response to a second manner of actuation of said control, wherein said controller provides second and third siren control signals to activate said siren in response to said panic and locate signals, said second and third siren control signals corresponding to second and third predetermined durations of said alarm sound;

wherein said first manner of actuation of said control is continuous actuation for less than a predetermined duration and said second manner of actuation of said control is continuous actuation for greater than said predetermined duration.

13. The vehicle security system recited in claim 12 wherein said vehicle has parking lights and said controller provides first and second parking light control signals to activate said parking lights in response to said locate and panic signals, respectively, wherein said parking lights flash for said second and third predetermined durations in response to said first and second parking light control signals, respectively.

14. A vehicle security system comprising:

a plurality of sensors each one sensing a condition associated with said vehicle and providing an output signal indicative of said condition; and a controller operable in an armed mode in which each of said plurality of sensor output signals is monitored for an intrusion indicating condition, an alarmed mode in which an alarm sound is provided to indicate the occurrence of said intrusion indicating condition during said armed mode and a disarmed mode in which said plurality of sensor output signals is not monitored for said intrusion indicating condition, said controller further being operable in a diagnostic mode of operation in which the operability of a selectable one of said plurality of sensors is tested, without entering said alarmed mode of operation;

wherein said diagnostic mode of operation comprises a plurality of diagnostic routines, each one corresponding to different selected ones of said ports.

15. The vehicle security system recited in claim 14 wherein said diagnostic mode of operation comprises a plurality of diagnostic routines, each one corresponding to different selected ones of said ports.

16. A vehicle security system comprising:

a plurality of sensors, each one sensing a condition associated with said vehicle and providing output signal indicative of said condition;

a controller operable in an armed mode in which each of said plurality of sensor output signals are monitored for an intrusion indicating condition, an alarmed mode in which an alarm sound is provided to indicate the occurrence of said intrusion indicating condition during said armed mode, and a disarmed mode in which said plurality of sensor output signals are not monitored for said intrusion indicating condition, said controller further being operable in a diagnostic mode of operation in which the operability of at least one of said plurality of sensors is tested, without entering said alarmed mode of operation, wherein said controller has a plurality of ports, each one corresponding to at least one of said plurality of sensors, and wherein said controller monitors a selected one of said ports during said diagnostic mode of operation, wherein said diagnostic mode of operation comprises a plurality of diagnostic routines, each one corresponding to different selected ones of said ports; and a remote control in communication with said controller for selecting one of said diagnostic routines.

17. A vehicle security system comprising:

A plurality sensors, each one sensing a condition associated with said vehicle and providing an output signal indicative of said condition;

a controller operable in an armed mode in which each of said plurality of sensor output signals is monitored for an intrusion indicating condition, an alarmed mode in which an alarm sound is provided to indicate the occurrence of said intrusion indicating condition during said armed mode, a disarmed mode in which said plurality of sensor output signals is not monitored for said intrusion indicating condition and a diagnostic mode in which the operability of a selectable one of said plurality of sensors is tested, without entering said alarmed mode of operation: and a siren operable to provide said alarm sound in the alarmed mode and to provide a diagnostic-indicator sound, wherein the operability of said selectable one of said plurality of sensors is indicated in the diagnostic mode by activation of said siren to provide said diagnostic-indicator sound.

18. A vehicle security system comprising:

a controller for providing an alarm signal in response to a condition of said vehicle being indicative of an intruder to said vehicle when said system is in an armed mode of operation;

a remote control, having an RF generator for generating an RF signal for communicating with said controller, said RF signal providing data bursts with a predetermined format; and an RF receiver circuit receiving said RF signal from said remote control to provide a pair of signals to said controller, a first one of said signals containing replicas of said bursts of said RF signal generated by said remote control and a second one of said signals providing a verification that said replicas of said data bursts of said first signal have said predetermined format;

wherein said RF receiver circuit includes a pair of comparators each one having an input coupled to said received RF signal through a receiver and a corresponding capacitor, wherein the time constant established by said capacitor corresponding to said first comparator is faster than the time constant established by said capacitor corresponding to said second comparator, and wherein said first signal is provided at the output of said first comparator and said second signal is provided at the output of said second comparator.

19. The vehicle security system recited in claim 18 wherein said second signal provides an indication of the strength of said received RF signal.

20. The vehicle security system recited in claim 18 wherein said RF receiver circuit includes means for comparing a portion of said replicas of said data bursts to a stored digital word in response to said verification provided by said second signal.

21. A vehicle security system comprising:

a plurality of sensors, each one providing a corresponding sensor output signal indicative of a vehicle intrusion:

an auxiliary vehicle component operable in response to an auxiliary command, wherein said auxiliary command causes at least one of said plurality of sensor output signals to indicate a vehicle intrusion;

a controller operable in an armed mode of operation and having means for identifying the at least one of said plurality of sensor output signals that the auxiliary command causes to indicate a vehicle intrusion, said controller for providing an alarm signal in response to one or more of said plurality of sensor output signals being indicative of said intrusion unless said identifying means identifies said one or more of said plurality of sensor output signals indicative of said intrusion as the at least one of said plurality of sensor output signals that the auxiliary command causes to indicate a vehicle intrusion.

22. A vehicle security system installed on a vehicle having at least one door with a door switch, the state of said door switch indicating whether said at least one door is open, a dome light activated in response to said door switch indicating that said at least one door is open, and an ignition, said vehicle security system comprising:

a plurality of sensors, each one providing an output signal indicative of an intrusion to said vehicle; and a controller operable in an armed mode of operation in which said sensor output signals are monitored for said intrusion and a disarmed mode of operation in which said sensor output signals are not monitored for said intrusion, wherein said controller activates said dome light when said disarmed mode of operation is entered or when said ignition is turned off for a predetermined interval and periodically deactivates said dome light during said interval to monitor said door switch.

23. A vehicle security system comprising:

a plurality of sensors, each one providing an output signal indicative of an intrusion to said vehicle;

a controller operable in an armed mode of operation in which said output signals from said plurality of sensors are monitored to detect said intrusion and a disarmed mode of operation in which said output signals from said sensors are not monitored to detect said intrusion; and a remote control in communication with said controller to select said armed mode of operation or said disarmed mode of operation, wherein said controller operates in accordance with a clock signal to process said remote control communication, said clock signal being established by a resistor, a capacitor, and a calibration factor related to the difference between a preliminary clock signal established by said resistor and said capacitor and a reference clock signal.

* * * * *